US008910262B2

(12) United States Patent
Mayblum et al.

(10) Patent No.: US 8,910,262 B2
(45) Date of Patent: Dec. 9, 2014

(54) SUPPORTING MULTIPLE MESSAGING SERVICES ON MOBILE DEVICES IN A SINGLE USER EXPERIENCE

(71) Applicant: Cellco Partnership, Arlington, VA (US)

(72) Inventors: Amir Mayblum, Walnut Creek, CA (US); Chunkwok Lee, Santa Clara, CA (US); Alice Yuan Bain, Morristown, NJ (US); Kim M. Gutierrez, Alameda, CA (US)

(73) Assignee: Cellco Partnership, Basking Ridge, NJ (US)

( * ) Notice: Subject to any disclaimer, the term of this patent is extended or adjusted under 35 U.S.C. 154(b) by 10 days.

(21) Appl. No.: 13/724,302

(22) Filed: Dec. 21, 2012

(65) Prior Publication Data

US 2014/0181934 A1 Jun. 26, 2014

(51) Int. Cl.
*G06F 7/04* (2006.01)
*H04L 29/06* (2006.01)

(52) U.S. Cl.
CPC ..................... *H04L 63/10* (2013.01)

USPC ............................... 726/7; 713/168

(58) Field of Classification Search
CPC ....... G06F 21/31; H04L 63/08; H04L 63/083; H04L 9/32
See application file for complete search history.

(56) References Cited

U.S. PATENT DOCUMENTS

| 2011/0093367 | A1* | 4/2011 | Stapleton ........................ 705/30 |
| 2011/0231499 | A1* | 9/2011 | Stovicek et al. ............... 709/206 |
| 2011/0252240 | A1* | 10/2011 | Freedman et al. ............. 713/169 |
| 2013/0104206 | A1* | 4/2013 | Waghmare et al. ............... 726/6 |
| 2013/0227659 | A1* | 8/2013 | Raleigh .............................. 726/5 |
| 2013/0290477 | A1* | 10/2013 | Lesage ........................... 709/217 |

* cited by examiner

*Primary Examiner* — Fikremariam A Yalew

(57) ABSTRACT

A system is described that contains a device including a memory with a management application installed thereon. The management application contains a manager that generates a plurality of user accounts and associates at least one communication service as a messaging account with each user account, and an interface module that generates a user interface that presents the plurality of user accounts and that modifies the user interface based on the identification of the selected user account to present a selected account display.

22 Claims, 13 Drawing Sheets

100a

100b

SUPPORTING MULTIPLE MESSAGING SERVICES ON MOBILE DEVICES IN A SINGLE USER EXPERIENCE

BACKGROUND

Telecommunications service providers and social media providers often provide customers with unique account management interfaces for a particular device or operating system that are dependent upon a specific messaging or social media service. The proliferation of such service dependent interfaces result in inefficiency and frustration for users who are looking for an integrated management experience while taking advantage of the positive attributes of a particular device or operating system.

For example, messaging services, such as Mobile Messaging, Google Chat, Facebook Chat, American Online Instant Messenger, Yahoo! Instant Messenger, etc., have service dependent interfaces that require separate user log-ins through separate software applications or webpages.

Thus, a user must separately open the service dependent interfaces via individual software applications or webpages and inefficiency log-in to each messaging service to send and receive messages.

DETAILED DESCRIPTION

Figure 1A:
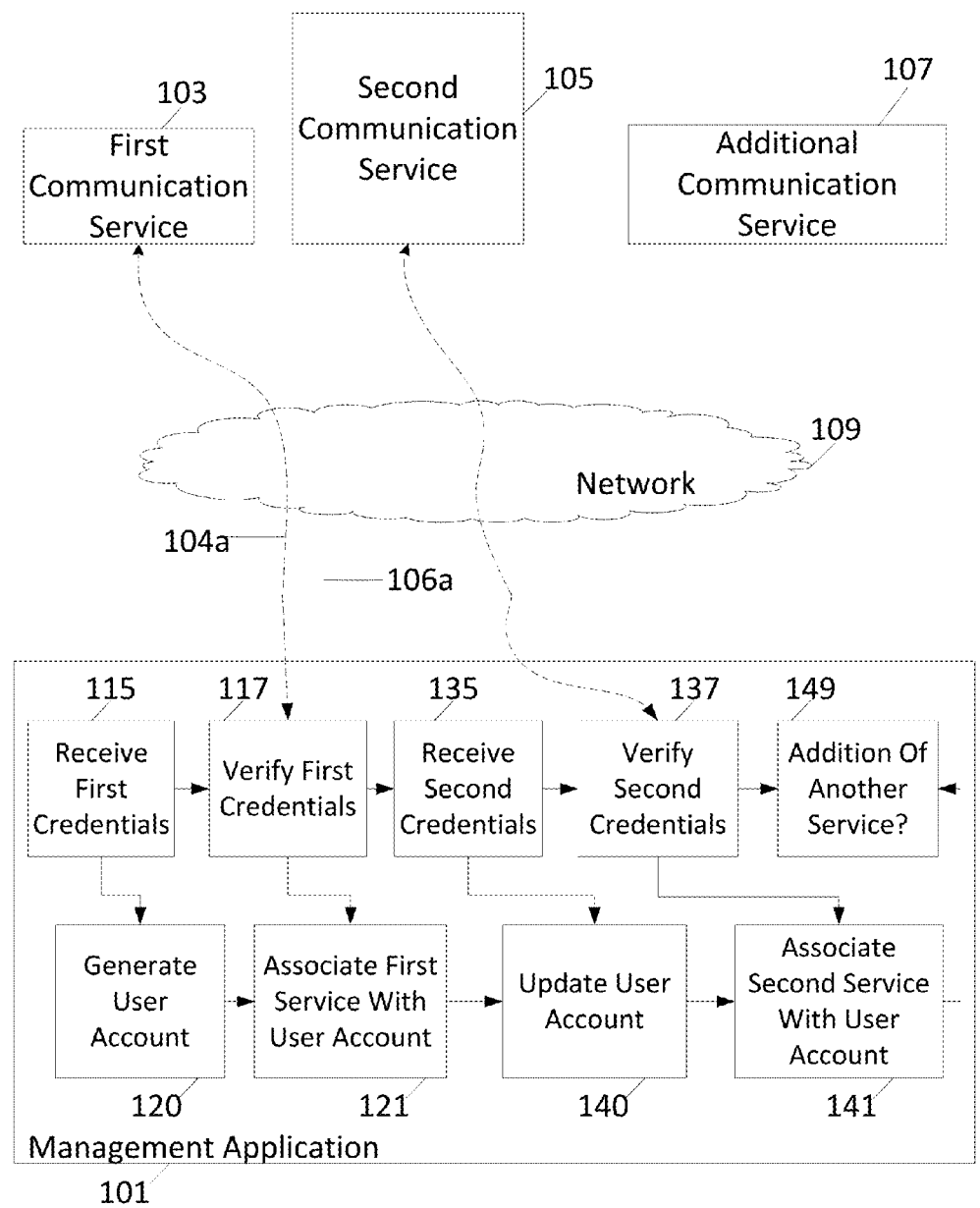
FIGS. 1A-C illustrate an exemplary system in which a management application installed on the memory of an electronic device generates a user account and associates messaging services with the generated user account.

An exemplary system and method may include an account management interface, rendered and supported by a management application, for operating and managing multiple user accounts and multiple messaging services on the same electronic device or operating system.

A user account may be an umbrella data structure for managing a set of messaging accounts. Further, the user account may be a data structure identified by a unique username with which sub-structures (e.g. messaging accounts) are associated.

A messaging account may be a sub-structure identified by a set of messaging account authentication credentials (e.g., a username and password), which upon verification permit the messaging account to access and utilize a messaging service.

Authentication credentials (e.g., messaging account credentials) are used in an authentication process to verify a messaging account by an electronic device external to a messaging service. Examples of authentication credentials include but are not limited to usernames and passwords, token password verification, voice recognition, and the like.

Messaging services may include one or more of a variety of resources, including website databases, file storage databases, media databases, data repositories, and the like that are implemented through hardware, software, or both to provide, store, and manage service information.

Service information is information, which includes messaging account credentials, contact information, online status information, and message information, generated and utilized by a messaging service in support of the exchange of messages between messaging accounts on electronic devices.

Messaging services may include multimedia messaging services (MMS), short messaging services (SMS), enhanced messaging services, internet relay chat services, instant messaging services, or any service that uses at least one standardized communication protocol to provide, store, and manage the exchange of messages.

On example of a messaging service is Mobile Messaging, which may be a combination of MMS and SMS. Further, other examples of messaging services include Google Chat, Facebook Chat, American Online Instant Messenger, Yahoo! Instant Messenger, etc.

Messages may be a script (text) or object (content) that communicates information between messaging accounts. Examples of text and content include typed text, electronic mail, pictures, videos, web links, locations, contacts, or any media, multimedia, and the like. Messages may also include content within text or associated with text.

Thus, in an exemplary system and method discussed in more detail below, the management application may store and manage a set of umbrella data structures, where each structure is identified by a unique username and includes a set of associated sub-structures identified by messaging account authentication credentials, and may perform based on the umbrella data structures and associated sub-structures polling operations to synchronize service information between the messaging services and the management application.

Polling operations may include one or more of a variety of pull/push technologies, synchronization technologies, sampling technologies, and the like that are implemented through hardware, software, or both to provide, transfer, and link service information between messaging services and the management application.

Further, the account management interface, which is rendered by a management application, may be integrated with the umbrella data structures and associated sub-structures to provide an integrated management experience to a user based on the polling, storing, and managing by the management application.

The account management interface may be a combination of user interfaces that are based on a selected umbrella data structure and associated sub-structures for displaying service information.

Thus, as the management application performs background polling operations with service information from different messaging services, the account management interface may display the synchronizing service information.

The result is an efficient integrated management experience that permits multiple users to separately configure and independently operate their messaging accounts on the same electronic device or operating system without the need to tediously log-in and -out of service dependent interfaces.

For example, in general, users must separately open the service dependent interfaces via individual software applications or webpages and inefficiency log-in to each messaging service to send and receive messages. For instance, if a first user of an electronic device is using a first service dependent interface (e.g., a software application) for the Mobile Messaging service, then the first user would have to exit that interface and separately open a second service dependent interface (e.g., a webpage) to access their Facebook Chat service. Additionally, if a second user wants to utilize the first service dependent interface for their Mobile Messaging service on the electronic device, the second service dependent interface must be exited, the first service dependent interface must be reopened, and the electronic device must be converted from the first user's Mobile Messaging service to the second user's Mobile Messaging service (e.g., each user must perform logging-in and -out operations while switching service dependent interfaces). Further, with each change in service, the prior user's service information is deleted, voided, or lost, such that when a service is re-accessed, the service dependent interface must reload the deleted service information.

In contrast, with the exemplary system and method, both the first and second user would create individual user accounts through the account management interface and associate their respective messaging accounts (e.g., Mobile Messaging services and Facebook Chat services) to their individual user accounts. The management application would then polls service information from the respective messaging services regardless of which user account is in operation, and the account management interface displays the polled service information (and thus without deleting and reload service information).

Therefore, through the account management interface, either the first or second user may select their respective user account to display their particular messages or particularly configure their user accounts and respective messaging accounts without further logging-in and -out or switching of interfaces.

In view of the above, a description of generating (e.g., creating or adding) a user account by a management application will now be given in reference to FIGS. 1A-C.

FIG. 1A illustrates an exemplary system 100a in which a management application 101 generates a user account and associates messaging services with the generated user account. Further, FIG. 1A illustrates the management application 101 performing a user account setup process (see blocks 115-149) that generates a first user account including two associated messaging services, by communication through a network 109 with two communication services within the exemplary system 100a.

Figure 1B:
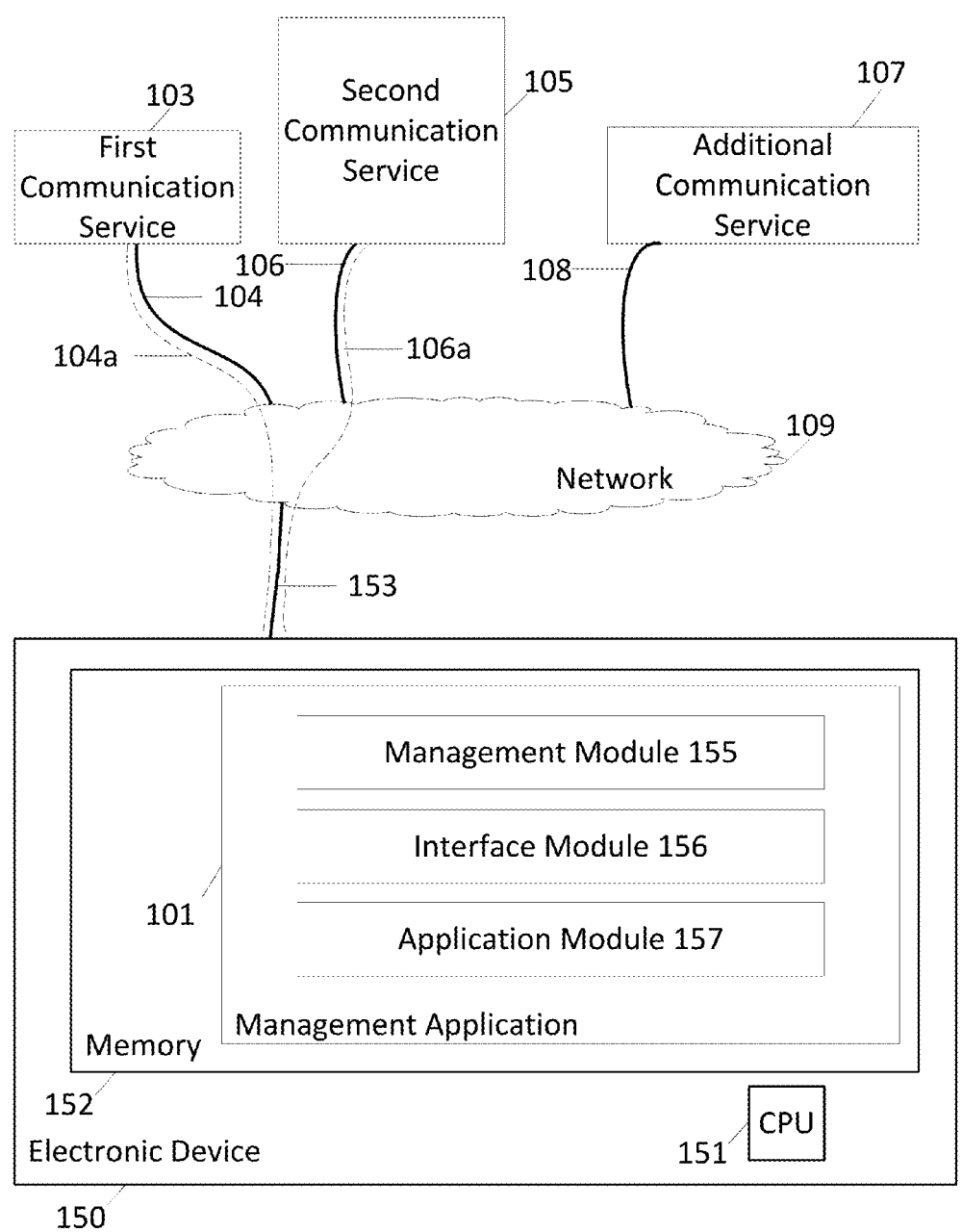

In general, as illustrated in FIG. 1B, the management application 101 utilizes a user interface module 156 to generate the account management interface to receive user input, such as operation instructions that include user account information and messaging account authorization credentials for the management application 101. Once the user input is received, the management application 101 utilizes a management module 155 to generate, manage, and operate the user account. Further, the management application 101 utilizes an application module 157 to continuously communicate with software and hardware external (e.g., the communication services) to the management application 101 in support of the management module's 155 operations. In addition, for example, FIG. 1C illustrates an exemplary system 100c in which user accounts 170.1 to 170.i, which were generated according to the user account setup process of FIG. 1A, are managed and operated according to the management application module 101 as illustrated by FIG. 1B.

Thus, as illustrated in FIG. 1A, the exemplary system 100a includes the management application 101, a first communication service 103, a second communication service 105, an additional communication service 107, the network 109, a virtual connection 104a, and a virtual connection 106a.

Further, FIG. 1B illustrates the physical components utilized to perform the user account setup process. As illustrated in FIG. 1B, the exemplary system 100b includes a physical connection 104, a physical connection 106, a physical connection 108, an electronic device 150, a central processing unit (CPU) 151, a memory 152, a physical connection 153, the management module 155, the user interface module 156, and the application module 157. In addition, FIG. 1C illustrates the umbrella data structures (e.g. user accounts 170.1 to 170.i) resulting from FIGS. 1A-B, where each umbrella data structure further includes a different sub-structure combination example.

Exemplary systems 100a-b may be referred to as computing systems that may take many different forms and include multiple and/or alternate components and facilities. While exemplary systems 100a-b are shown in FIGS. 1A-B, the exemplary components illustrated in FIGS. 1A-B are not intended to be limiting. Indeed, additional or alternative components and/or implementations may be used.

The electronic device 150 may be referred to as a computing device that in turn includes hardware and software in support of the management application 101. In particular, the electronic device 150 includes the CPU 151 and the memory 152 (e.g. non-transitory computer readable medium), where the CPU 151 executes instructions that may be constructed from program code stored on the memory 152. Further, the instructions stored on the memory 152 include the management application 101.

With regard to the computing systems and/or devices, such as systems 100a-b, electronic device 150, and communication services 103, 105, 107 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, or handheld computer, or some other computing system and/or device, such as tablet computers or mobile phones.

Computing devices generally include computer-executable instructions, where the instructions may be executable by one or more computing devices such as those listed above. Computer-executable instructions may include, without limitation, executable files, operation codes, data structures, or any structure that may cause a computing device to perform tasks and any combination thereof. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) may include any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Thus, the management application 101 is generally constructed from program code stored on the non-transitory computer readable medium. The management application 101 includes the management module 155, the user interface module 156, and the application module 157. The management application 101 may also be constructed from hardware, software, or a combination of hardware or software.

The management module 155 includes instructions for performing authentication, management, selection, notification, privacy, and composer operations. That is, the management module 155 may include program code and specifications for routines, data structures, object classes, and variables that generate, manage and support multiple user accounts and the association of multiple messaging services with multiple user accounts on the electronic device 150.

The management module 155 performs authentication operations via an authentication mechanism. Authentication operations include but are not limited to the verification of authentication credentials via an authentication sequence, such as user/password authentication, and the identification of messaging services related to the authentication credentials.

The management module 155 performs management operations via a management mechanism. Management operations include the generation of umbrella data structures (e.g. user accounts) and associating sub-structures (e.g. messaging accounts) to the umbrella data structures. The umbrella data structures may include a shell configuration for each sub-structure, which may instruct the management module to connect to a particular messaging service and verify the messaging account credentials.

Management operations also include the generation of profiles that summarize the umbrella data structure. The profiles are exportable and transferable code that assist in the duplication of the umbrella data structure on devices other than electronic device 150.

Further, the generation of umbrella data structures and associating sub-structures by way of the management mechanism includes integrating configurable settings that may be accessed through the account management interface. Thus, each umbrella data structure and its associated sub-structures may be individually configurable through the account management interface.

Management operations may also include polling service information for each associated sub-structure by performing background polling operations with the messaging service related to the associated sub-structure. Management operations, such as polling, may be performed repeatedly, sequentially, simultaneously, or arbitrarily, at fixed, optimal, or variable intervals.

The management module 155 performs selection operations via a selection mechanism. Selection operations include utilizing user input to identify and select umbrella data structures, sub-structures, and service information with the account management interface.

The management module 155 manages notification operations via a notification mechanism. Notification operations include the management and display of notifications of polled service information.

A notification may include banners, badges, alerts, sounds, text, or any combinations thereof that signals an event. A banner may be a drop-down menu that extends from a top portion of an electronic display and that may include text, badges, and animated symbols. A badge may be a number or symbol associated with a messaging service or an account. An alert may be a pop-up window that is centered on the electronic display and that may include text, badges, and animated symbols.

In addition, notification operations may include the integration of the notification mechanism with the electronic device's 150 notification engine to manage notifications regarding service information.

For example, the notification mechanism may include program code for push technology to generally manage notifications from messaging services (e.g., communication services 103, 105, 107) within a constantly open IP connection (e.g., virtual connection 104a, 106a).

The management module 155 performs privacy operations via a privacy mechanism. Privacy operations include operating and implementing privacy settings, such as limiting user account or messaging account access (e.g., via passwords), providing encryption, permitting editing and viewing authority, and the like.

For instance, a privacy setting may include configurable features or settings that globally affect all associated sub-structures or that individually apply to each associated sub-structures.

For example, the privacy mechanism may also include program code for implementing the privacy setting of a locked/unlocked user account mode, where the locked mode is when access to messages associated with an account may require users to enter authorization credentials to view those messages. Further, the unlocked mode is when users can view messages without the need to enter authorization credentials.

Further, the privacy mechanism also allows the management application 101 to control the notification mechanism and works in conjunction with the selection mechanism to select between operation modes. One example of a set of operation modes includes an inclusion mode, an exclusion mode, and a disable mode.

The inclusion mode is a mode where message content may be included in a notification, e.g., when a new message is received by the electronic device 150, a notification may be displayed on a screen of the electronic device 150 that may include sender information, such as a phone number or an address book name along with the message content.

The exclusion mode is a mode where message content may be excluded from a notification, e.g., when a new is received by the electronic device 150, a notification may be displayed on the screen of the electronic device 150 that may show the number of unread messages and that may not display service information relative to the sender or message content.

The disable mode is a mode where account notifications may be disabled, e.g., when a new message is received by the electronic device 150, a notification may be not displayed on a screen of the electronic device 150.

The user interface module 156 includes instructions for generating the account management interface, which is used to receive user input, such as messaging account credentials, display user instructions, and concurrently display user accounts, associated messaging services, and polled service information. The interface module 156 may generate the account management interface in various formats, including but not limited to menu, icon, tabular, map, or grid format, to provide an integrated user management tool for multiple user accounts and associated messaging services on the same electronic device 150.

Further, the user interface module 156 may include program code for generating, presenting, and providing one or more sub-user interfaces in connection with the account management interface, such as pop-up interfaces (including notification alerts as described above)

A pop-up interface is an interface, which overlays the current display of an electronic display, for providing and/or submitting additional information. For example, the pop-up interface may provide instructions along with buttons or icons that allow a user to respond to the provided instructions. An icon may be a pictogram, small picture, symbol, or the like serving as a quick and intuitive representation of a software tool displayed on the electronic display.

The interface module 156 may also generate the account management interface to display mapping and analytical tools to the user. For example, the account management interface may display a pin-point on a map for polled service information (e.g., a postal address communicated in a message) or a singular map with pin-points according to a list of postal address.

Other examples of analytical tools include concurrently displaying a table or grid of media data within designated tiles so that the multiple user accounts and associated messaging services may be readily obtained and managed on the same device. In addition, the account management interface may through a grid or table, permit reordering of display items, such as reordering tiles, contacts, and messages based on preferences (e.g., alphabetically), on attributes (e.g., time and date), or on any other characteristics.

The interface module 156 also performs composer operations via a composer mechanism. Composer operations include providing through the account management interface a unified composer interface that works in conjunction with the selection mechanism to select a user account, a source messaging service, and a destination messaging account. That is, the unified composer permits the entry of a message and selection of a source messaging service (e.g. the sender) and a destination messaging account (e.g. the recipient) such that, messages may be sent via the unified composer from any associated messaging account through the user account of the account management interface.

The application module 157 includes instructions for communicating directly with other applications, modules, models, devices, and other sources through both physical and virtual connections. That is, the application module 157 may include program code and specifications for routines, data structures, object classes, and variables that package and present data entered by a user through the account management interface generated by the interface module 156 for transfer over the network 109.

Thus, the management application 101 utilizing the above modules 155-157 is configured to provide account management by generating an account management interface that will organize and display multiple user accounts, associated messaging services, and service information. Although the above example of the management application 101 may include certain specific modules 155-157, the same or similar operability may be achieved using fewer, greater, or differently named modules located on the same or separate devices.

Further, the management application 101 may be configured to operate as background processes on the electronic device 150 without user interaction; e.g., the management application 101 may perform organize, manage, and display multiple user accounts and associated messaging services. The management application 101, when executing the automatic background process of organizing, managing, and displaying multiple user accounts and associated messaging services, may also automatically notify, authenticate, and send/receive messages and content that require further processing.

The first communication service 103, the second communication service 105, and the additional communication service 107 are messaging services, as described above, and are distinct from each other. These communication services 103, 105, 107 may also include various kinds of mechanisms for storing, supplying, and sending various kinds of data, including databases, data repositories, or other data stores. The communication services 103, 105, 107 are typically external to the electronic device 150 that the management application 101 is installed upon.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The network 109 is a collection of computers and other hardware to provide infrastructure to carry communications. In other words, the network 109 is an infrastructure that generally includes edge, distribution, and core devices and provides a path for the exchange of information between different devices and systems (e.g., between the electronic device 150 and the first communication service 103). Further, the network may be any conventional networking technology. For instance, network 109 may, in general, be any packet network (e.g., any of a cellular network, global area network, wireless local area networks, wide area networks, local area networks, or combinations thereof, but may not be limited thereto) that provides the protocol infrastructure to carry communications between the management application 101 and communication services 103, 105, 107.

Thus, in the exemplary systems 100a-b, for example, the electronic device 150 is connected to the network 109 by the physical connection 153, which is comprised of computers and other hardware. For instance, the physical connection 153 may be the wired or wireless connection to a router on the edge of a network. Similarly, physical connections 104, 106, 108 are comprised of computers and other hardware that respectively connect communication services 103, 105, 107 to network 109.

Further, because of the communication services 103, 105, 107 and the electronic device 150 are connected to a network and because the network provides an infrastructure to carry communications, virtual connections 104a, 106a may be established respectively between communication services 103, 105, and the electronic device. These virtual connections 104a, 106a are the protocol infrastructure that enables communication to and from the management application 101 and the communication services 103, 105 (e.g., the polling of service information).

Continuing, as illustrated in FIG. 1A, the management application 101 may perform a user account setup process illustrated in an exemplary manner by way of blocks 115 through 149.

The management application 101 may initially receive, in block 115, messaging account credentials related to the first communication service 103 via the account management interface, as generated by the user interface module 156.

In particular, when the management application receives the messaging credentials, the management application 101 will also identify the messaging service related to the messaging account. That is, the authentication mechanism of the management application 101 may utilize the messaging account credentials to extract the identity and type of messaging service. In the case of block 115, the authentication mechanism utilizes the received first credentials to extract the identity of a first communication service 103.

Next, in block 117, the management application 101 verifies those credentials by an authentication sequence performed by the authentication mechanism with the first communication service 103 through virtual connection 104a while, in block 120, generating an umbrella data structure (e.g., a user account) and a first sub-structure (e.g. messaging account and service related to the first communication service) by an user account creation sequence via the management mechanism.

The authentication sequence is a process of verifying by the authentication mechanism the messaging account with the messaging service, identified in block 115. The process includes the application module 157 of the management application 101 establishing a connection 104a with the first communication service 103 (which in this case is the identified messaging service from block 115) sending authorization credentials (e.g., first credentials) to the first communication service 103 over a virtual connection 104a, and receiving over the virtual connection 104a confirmation from the first communication service 103 that ensures the messaging account is valid. Once the first credentials are verified, the management application 101 may commence polling operations to acquire service information related to the first communication service 103.

The user account creation sequence is a process of generating the umbrella data structure where the management mechanism receives or identifies the unique username through the account management interface and generates configurable portions of the umbrella data structure (e.g. sub-structures) so that the verified messaging accounts may be properly associated.

Next, in block 135, the management application 101 receives via the account management interface additional messaging account credentials (e.g. second credentials). Upon receipt, the management application 101 utilizes the received second credentials to extract the identity of a second communication service 105.

In addition, in block 121, the management mechanism of the management application 101 associates service information related to the first communication service 103 with the first sub-structure generated in block 120. That is, the management mechanism of the management application 101 may commence polling operations to acquire service information related to the first communication service 103 via the established virtual connection 104a.

Next, similar to the authentication sequence of block 117 described above, the management application 101, in block 137, verifies the second credentials by an authentication sequence performed by the authentication mechanism with the second communication service 105 through virtual connection 106a. Once the second credentials are verified, the management application 101 may commence polling operations to acquire service information related to the second communication service 105.

Further, in block 140, the management application 101 updates the user account generated in block 120 by performing portions of the user account creation sequence to associate a second sub-structure (e.g., a second messaging account and service based on the second credentials). That is, the management application 101 generates a configurable portion of the umbrella data structure that relates to the second credentials.

In addition, in block 141, the management mechanism of the management application 101 associates service information related to the second communication service 105 with the second sub-structure generated in block 140. That is, the management mechanism of the management application 101 may commence polling operations to acquire service information related to the second communication service 105 via the established virtual connection 106a.

Next, in block 149, the account management interface and managements application may wait to receive other credentials. If, in block 149, the management application 101 does not receive other messaging account credentials, then the process ends. If, in block 149, the management application 101 receives other messaging account credentials, then the management application 101 may perform additional authentication and user account creation sequences to accommodate the other messaging account credentials. For instance, a virtual connection may be established with the additional communication service 107 and the user account setup process would continue to generate or associate the umbrella data structure with additional sub-structures.

That is, additional messaging services may be added to and associated with the user account upon verification. And when additional messaging services are added, a connection is established to the additional communication service 107. Thus, although no virtual connection is shown between the electronic device 150 and the additional communication service 107, a virtual connection may be established over physical connections 153, 108 and through network 109 when the account management interface receives additional credentials and identifies another messaging service that is distinct from the first and second communication services 103, 104. Further, the additional communication service 107 is exemplary, as it represents plurality of additional messaging services that may be added by the management application 101. And, although the management application is illustrated in connection with a different communication service for each first and second user credentials, the management application will connect with different communication services based on the generated umbrella data structures and associated sub-structures.

Figure 1C:
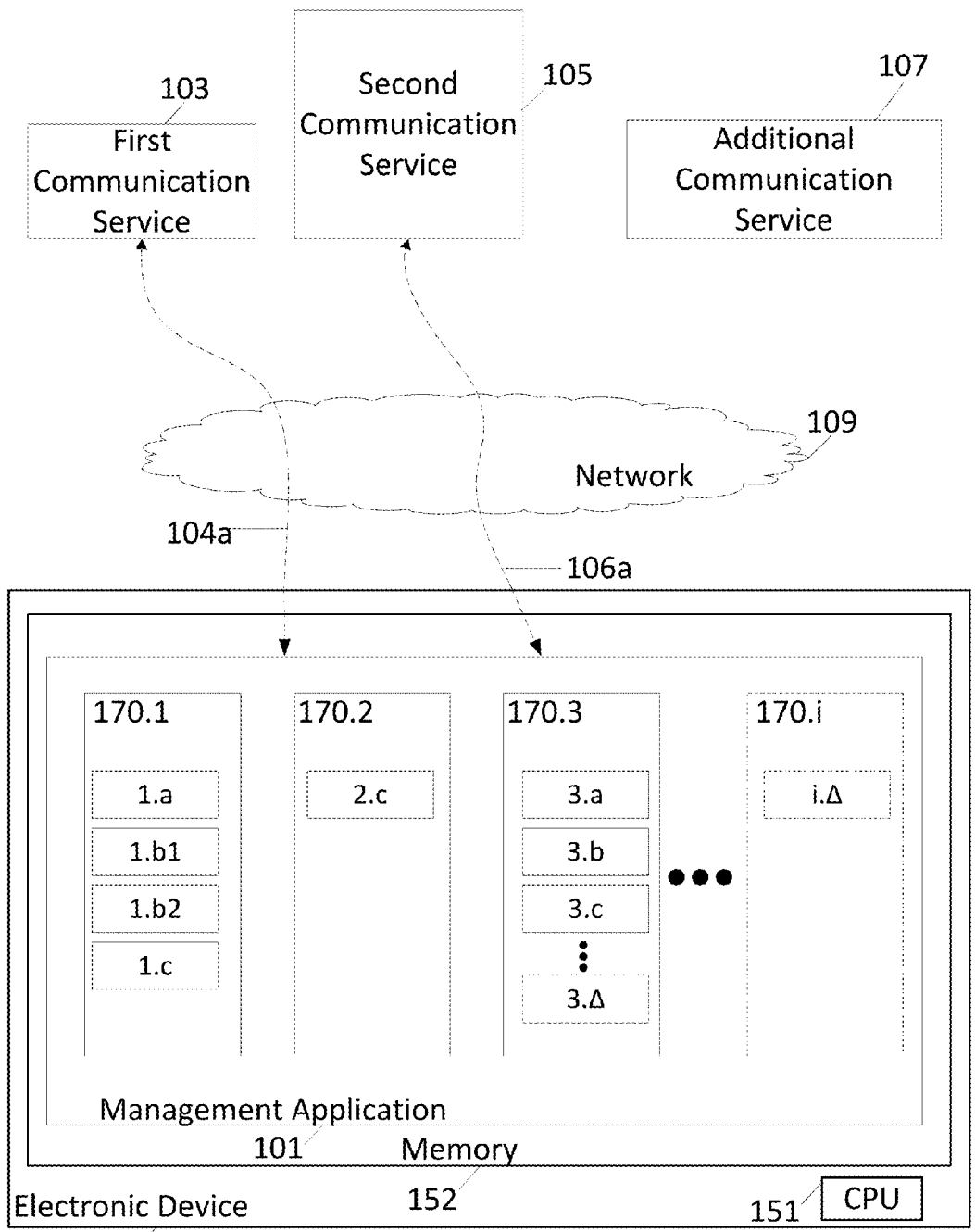

For instance, in FIG. 1C, the management application 101 has generated at least three umbrella data structures (e.g., user accounts 170.1-170.3) that include different combinations of associated sub-structures, and may also generate and manage additional umbrella data structures (e.g., the management application may generate and manage 'i' user accounts, where i is a number greater than zero).

Additionally, each umbrella data structure has at least one associated substructure: for example, user account 170.1 is an umbrella data structure that has four associated sub-structures (e.g., messaging accounts 1.a, 1.b1, 1.b2, and 1.c), user account 170.2 is an umbrella data structure that has one associated sub-structure (e.g., messaging account 2.c), and user account 170.3 is an umbrella data structure that has at least three associated sub-structures (e.g., messaging accounts 3.a, 3.b, and 3.c).

Further, the sub-structure designations of FIG. 1C are as follows: 'a' is a first messaging service, 'b' is a second messaging service, and 'c' is a third messaging service. Thus, user account 170.1 has four messaging accounts, where messaging account 1.b1 and messaging account 1.b2 are the same messaging service type and communicate with the same communication service. That is, messaging account 1.a may communicate with the first communication service 103, messaging accounts 1.b1 and 1.b2 may communicate with the second communication service 105, and messaging account 1.c may communicate with the third or additional communication service 107.

The management application 101 may associate any combination and number of sub-structures with an umbrella data structure, as illustrated in user account 170.3, which shows a dotted-box containing the messaging accounts 3.4, where '4' is a designation that varies based the number of previously associated messaging accounts and messaging service types.

In addition, as the management mechanism generates and builds the umbrella data structures, polling rules may be generated for each sub-structure, such that the service information may be continuously synchronized (e.g., according to the operations of the polling rules). Therefore, once the user account setup process is complete, the management application 101 may continue to provide an integrated messaging system for multiple messaging services.

The management operations performed in blocks 120, 121, 140 and 141, although depicted as simultaneous with blocks 115, 117, 135, 137 and 149, may occur at any time. For instance, Management operations may also include polling service information for each associated sub-structure after the verification of the respective credentials by performing background polling operations with the messaging service related to the associated sub-structure.

Management operations, such as polling, may be performed repeatedly, sequentially, simultaneously, or arbitrarily, at fixed, optimal, or variable intervals.

Figure 2:
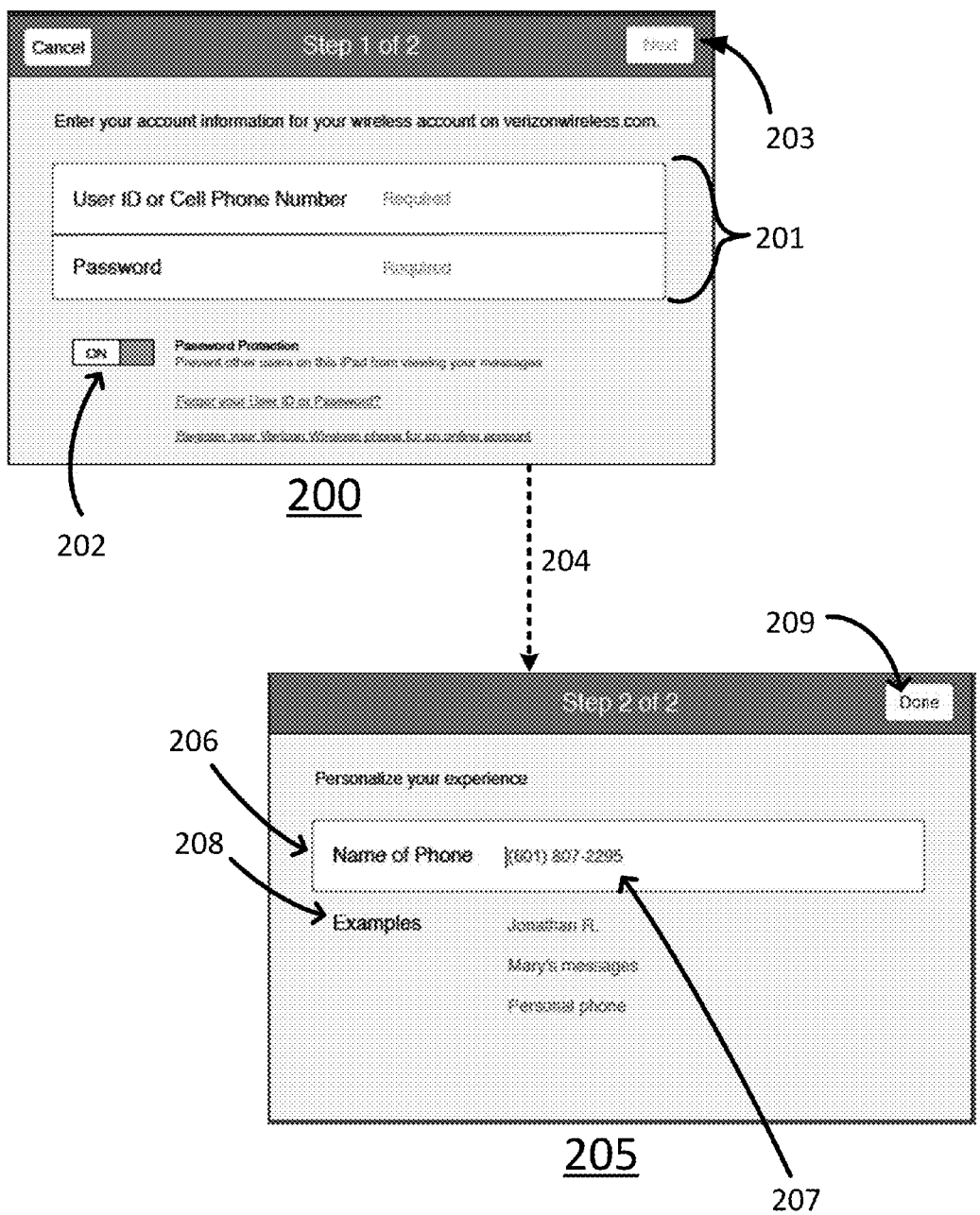
FIG. 2 illustrates exemplary account management interfaces for creating a user account.
Figure 3:
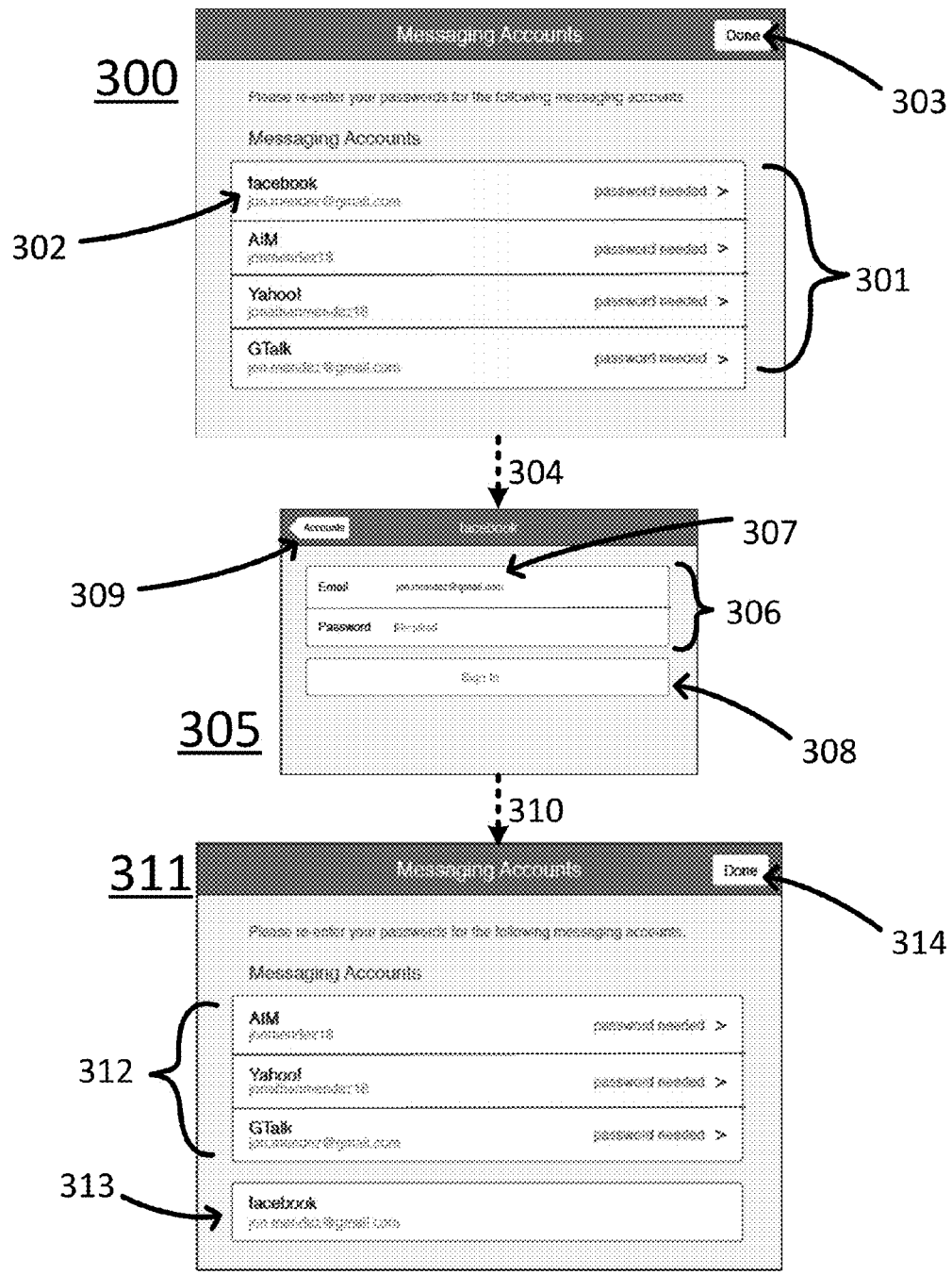
FIG. 3 illustrates exemplary account management interfaces for associating messaging services with a user account.

An exemplary user account setup process is described in connection with FIGS. 2 and 3, where FIG. 2 illustrates a set of user interfaces that may be associated with the user account setup process according to blocks 115-121, and where FIG. 3 illustrates a set of user interfaces that may be associated with the user account setup process according to blocks 135-149.

In general, the set of account verification interfaces of FIG. 2 illustrate an example of how the management application 101 may receive first user credentials for a messaging service (e.g., verizonwireless.com user credentials for a Mobile Messaging service) and how a unique username may be associated with a generated user account.

Further, as noted above, the management application 101 may be stored on the memory 152 of the electronic device 150. In the case of FIGS. 2 and 3, the electronic device 150 includes an electronic display that displays the account management interface according to the operations of the management application 101.

Alternative illustrative examples include the management application 101 stored on a memory of a host device, which includes a processor that executes the instruction of the management application 101, where the host device broadcasts the account management interface according to the operations of the management application 101 to a remote device that includes an electronic display for displaying the account management interface. That is, the host and user device have a server/client relationship where the host device performs the operation of the management application 101 and sends the account management interface to the remote device for display.

Thus, FIG. 2 illustrates exemplary account verification interfaces 200, 205 of the account management interface, as generated by the management application 101. The account verification interface 200 includes an account information entry field set 201, a password protection button 202, and a next button 203.

The account information entry field set 201 is a set of fields in which user credentials may be entered or submitted to the management application 101.

The password protection button 202 is a button that is connected to the privacy mechanism, such that its selection enables or disables a predetermined privacy setting. In the case of FIG. 2, the password button 202 is linked to a locked/unlocked user account mode. As discussed above, the locked/unlocked user account mode is derived from the code of the privacy mechanism and is a security measure that prevents other users from accessing a user account without knowing the authorization credentials.

The next button 203 by its selection initiates a transition 204 from the account verification interface 200 to account verification interface 205. In general, the next button 203 may be disabled (e.g., as indicated by the lettering color of the next button 203 being grey and the next button 203 not being selectable) until the user credentials are entered into the account entry field set 201 and automatically verified. Alternatively, the next button 203 may be enabled upon entry of user credentials and verification of the entered user credentials may be initiated by the selection of the next button 203.

Further, the account verification interface 205 includes a personalization field 206, a phone number 207, user name examples 208, and a done button 209.

The personalization field 206 is a field in which users may enter a unique username to identify the user account. The unique username entered into the personalization field will be the display name utilized by the account management interface.

Further, although the default display of the personalization field may vary, in the case of FIG. 2, the personalization field 206 automatically displays a cursor or the phone number 207. This display by the personalization fields assist the user in selecting a unique user name along with indicating that the phone number 207 may be change.

In addition, by default, the management application 101 may, for example, also use a wireless username or email (e.g., verizonwireless.com user credentials for a Mobile Messaging service) in place of the phone number 207. However, it should be noted that the unique user name for the umbrella data structure (e.g. user account) may be different from the verizonwireless.com user credentials for a Mobile Messaging service.

The user name examples 208 are examples of suggested alternative to the phone number 207. If the user desires to change the phone number 207 to a different unique username, then they may use the user name examples 208 as a guide.

The done button 209 is a button that upon selection ends the user account setup process, closes the account verification interface 205, and grants access to the account management interface or another user account setup process. Similarly to next button 203, the done button 209 may be disabled until the unique username is entered into the personalization field 206.

Thus, for example, the user account setup process and the exemplary account verification interfaces 200, 205 may be generated by the interface module 157 of the management application 101 for display on the electronic display when the management application 101 is loaded with no previously generated user accounts or when a new user account is being generated or registered to a user device.

In either case, the user account setup begins, in block 115, when the account verification interface 200 prompts for the receipt of a first set of authorization credentials (e.g. verizonwireless.com user credentials for a Mobile Messaging service). Specifically, the account information entry field set 201 of the account verification interface 200 indicates that the user credentials of "User ID or Cell Phone Numbers" and "Password" may be submitted to the management application 101.

When these user credentials are submitted through the account information entry field set 201, the authentication mechanism automatically identifies the messaging service (e.g., Mobile Messaging service) and performs the authentication sequence, as in block 115, while the management mechanism automatically generates an umbrella data structure (e.g., a user account), as in block 120.

The automatic identification, authentication, and generation operations by the mechanisms of the management application 101 may not go unnoticed. That is, while the management application 101 performs these operations, the account verification interfaces 200 may display indicators, such as checkmarks, in the account information entry field set 201 to confirm that the account information has been verified. Upon automatic verification, the next button may be activated and thus, upon its selection, the account verification interface 200 may transition 204 to account verification interface 205.

Alternatively, the next button 203 may be enabled upon entry of user credentials. Further, verification of the entered user credentials may be initiated by the selection of the next button 203. In this case, when the next button 203 is selected, a verification interface may be displayed while the authorization mechanism verifies the user credentials.

The verification interface may be an intermediate interface that displays a "verification pending message for a predetermined number of seconds (e.g., 'm' seconds, where m is a number greater than zero). In addition, during the predetermined number of seconds, the interface module 156 may generate and present checkmarks in the account information entry field set 201 to confirm that the account information has been verified.

Regardless of whether verification is automatic or initiated, once verification is complete and the next button 203 is selected, the account verification interface 200 may transition 204 to account verification interface 205.

After the transition 204, the management application 101 prompts the entry of a unique username to identify the user account via the personalization field 206. This interface may be displayed while associating the first service with the user account, as indicated in block 130. Thus, while the account verification interface 205 is displayed, the management mechanism may associate the messaging account with the user account and poll service information from the identified messaging service in the background.

Once the unique username is entered in the personalization field 206, the done button 209 may be selected to end the user account setup process and close the account verification interface 205. However, if the management mechanism is not finished polling service information, the account management interface may display a "loading" interface.

The "loading" interface may be a progress indicator for displaying the progress of the management mechanisms polling operations and may be displayed until the management mechanism is finished polling service information. Once finished, management application 101 may grant access to the account management interface or another user account setup process.

In addition, as illustrated in FIG. 2, the password button 202 is within the account verification interface 200. This is an example of the privacy mechanism implementing a privacy setting through the account management interface, and in particular, implementing the privacy setting of a locked/unlocked user account mode, as described above.

A shown, the password button 202 is in the "ON" position. To change this setting, the operation of the password button 202 may occur before the selection of the next button 203, and thus before transitioning 204 to account verification interface 205. If the password bottom 202 is not operated before the selection of the next button 203, and thus before transitioning 204 to account verification interface 205; the feature associated with the password button 202 may be subsequently configured through the account user interface.

FIG. 3 illustrates exemplary account association interfaces 300, 305, 311 of the account management interface, as generated by the management application 101, for associating messaging accounts with an already generated user account, under the user account setup process.

Thus, as illustrated in FIG. 3, the account association interface 300 includes a service tile set 301, a messaging service tile 302, and a done button 303.

The account association interface 300 is an interface for selecting and associating messaging accounts.

The service tile set 301 presents a set of tiles, where each tile represents a different messaging service. Each tile of the service tile set 301 is linked to a shell configuration for a sub-structure, such that when a tile is selected the shell configuration instructs the management module 301 as to how to connect to the messaging service and verify the messaging account credentials.

The messaging service tile 302 is a selectable tile that is linked to a shell configuration for a sub-structure that would support, for example, a Facebook Chat messaging service. In this case of FIG. 3, selecting the messaging service tile 302 initiates a transition 304 from the account association interface 300 to account association interface 305.

In addition, when the user registers the user account in a subsequent management application installed on a subsequent device (e.g. a device that is subsequent to the electronic device 150), the interface module 156 may automatically display the messaging accounts (e.g., facebook, AIM, etc.)

associated with the user account in the messaging service tiles of the service tile set 301 based on a profile, as generated by the management application 101 of the electronic device 150. In other words, the subsequent management application on the subsequent device may receive the profile based other messaging account information from the activity on the electronic device 150 and automatically populate the usernames, IDs, or emails of the other messaging accounts in the service tile set 301.

Further, the service tile set 301 may indicate that passwords should be respectively entered for the other messaging accounts. Alternatively, if the management application 101 cannot procure the usernames, IDs, and email addresses for some or all of the accounts, then the messaging accounts pop-up would not display these items.

The done button 303 is a button that upon selection ends the user account setup process, closes the account association interface 300, and grants access to the account management interface.

The account association interface 305 includes an account information entry field set 306, an email 307, a sign in button 308, and an account button 309.

The account information entry field set 306 is a set of fields in which messaging account credentials may be entered or submitted to the management application 101, similarly to the account information entry field set 201. Further, although the default display of the account information entry field set 306 may vary, in the case of FIG. 3, the account information entry field set 306 automatically displays the email 307. This display by the account information entry field set 306 assists the user in selecting messaging accounts. Although, if the user has yet to register a messaging account of a specific type then no suggestion may be displayed by default.

The sign in button 308, like the next button 203, initiates a transition 310 from the account association interface 305 to account association interface 311. In general, the sign in button 308 may be disabled (e.g., as indicated by the lettering color of the sign in button 308 being grey and the sign in button 308 not being selectable) until the messaging account credentials are entered into the account entry field set 201 and automatically verified. Further, the selection of the sign in button 308 not only initiates a transition 310, the selection also initiates messaging account credential verification by the authorization mechanism.

The account button 309 is a button that permits the reverse of transition 304. That is, because the selection of a messaging tile from the service tile set 301 causes a transition 304, the account button 309 is provided for selection so that the account management interface may return to the account association interface 300.

The account association interface 311 includes a service tile set 312, verified messaging service 313, and a done button 314. The account association interface 311 is an interface for selecting and associating messaging accounts.

The service tile set 312, similar to the service tile set 301, presents a set of tiles, where each tile represents a different messaging service. Each tile of the service tile set 312 is linked to a shell configuration for a sub-structure, such that when a tile is selected the shell configuration instructs the management module 301 as to how to connect to the messaging service and verify the messaging account credentials.

The verified messaging service 313 is a tile that resulted from a successful messaging account credential verification by the authorization mechanism.

The done button 314 is a button that upon selection ends the user account setup process, closes the account association interface 311, and grants access to the account management interface.

Thus, for example, the exemplary account association interfaces 300, 305, and 311 may be generated by the interface module 157 of the management application 101 for display on the electronic display when in the user account setup process described above, the done button 209 has been selected to close the account verification interface 205, or when the management application 101 has a previously generated a user account and a user desires to add additional messaging services to the user account.

In either case, the user account setup begins, in block 125, when the account association interface 300 prompts for the selection of one of the messaging service tiles from the service tile set 302. As illustrated in FIG. 3, the service tile set 301 includes a "facebook" tile, an "AIM" tile, a "Yahoo!" tile, and a "GTalk" tile, where each of the "facebook" tile, the "AIM" tile, the "Yahoo!" tile, and a "GTalk" tile are linked respectively to a shell configuration for a Facebook Chat messaging service, an American Online Instant Messenger messaging service, a Yahoo! Instant Messenger messaging service, and a Google Chat messaging service.

Next, if it is desired that one of the messaging accounts be authenticated and registered, then one of the service tiles may be selected from the service tile set 301.

Specifically, in this case, the messaging service tile 302 (e.g. the "facebook" tile) is selected. Further, when a user selects the "facebook" tile (i.e., chooses to enter the passwords for Facebook messaging service), the interface module 156 transitions 304 to the account association interface 305.

Next, the account management application 101 automatically prompts account association interface 305 that is relative to the service tile selected from the service tile set 301. In addition, a keyboard may be automatically displayed along with the account association interface 305.

In the case of FIG. 3, since the "facebook" tile was selected via the selection mechanism, a "facebook" account association interface is automatically presented. Messaging account credentials (e.g. Facebook password) may then be entered into the account information entry field set 306.

Once entered, the sign in button 306 may be selected to initiate verification of the authorization credentials for the Facebook messaging service.

Similarly to the next button 203, the sign in button 308 may also be inactive until the user has entered both an email and a password into the account information entry field set 306.

Next, after the user selects the sign in button 308, management module 155 authenticates and verifies the messaging account credentials for the messaging service via the authentication mechanism. Further, when the authentication mechanism of the management module 155 performs a successful verification, the account association interface 305 transitions 310 to account association interface 311 after a predetermined number of seconds (e.g., 'f' seconds, where f is a number greater than zero).

In addition, during the predetermined number of seconds, the interface module 156 may generate and present checkmarks in the account information entry field set 306 to confirm that the account information has been verified.

Next, the management application 101 pools service information relative now verified messaging account credentials of the Facebook messaging service, while displaying a new messaging accounts pop-up.

Further, because the Facebook messaging service has been authorized, the account association interface 311 now displays the service tile set 312 with three suggested messaging accounts (e.g., the "AIM" tile, the "Yahoo!" tile, and the "GTalk" tile) and the verified messaging service 313 (i.e., the authorized Facebook messaging service).

At this point, verification of other messaging services may continue (and thus continue associating messaging accounts with the user account), or the done button 314 may be selected to gain access to the account management interface of the management application 101.

Next, if the user selects the done button 314 to gain access to the account management interface of the management application 101 and the management application 101 did not finish polling the service information of the verified messaging services modes, the management application 101 may present a "loading" interface, as described above, until the management mechanism has completed polling.

After polling is complete, an account management interface is presented with all of the generated user accounts, associated messaging services, and polled service information. That is, the management application 101 generated the umbrella data structure, associated sub-structures, and polled service information according to each associated sub-structure, such that when the account management interface is generated by the management application 101, an efficient integrated management experience that permits multiple users through respective user accounts (e.g., umbrella data structures) to separately configure and independently operate their messaging accounts (e.g., associated sub-structures) on the same electronic device or operating system is presented.

Figure 4:
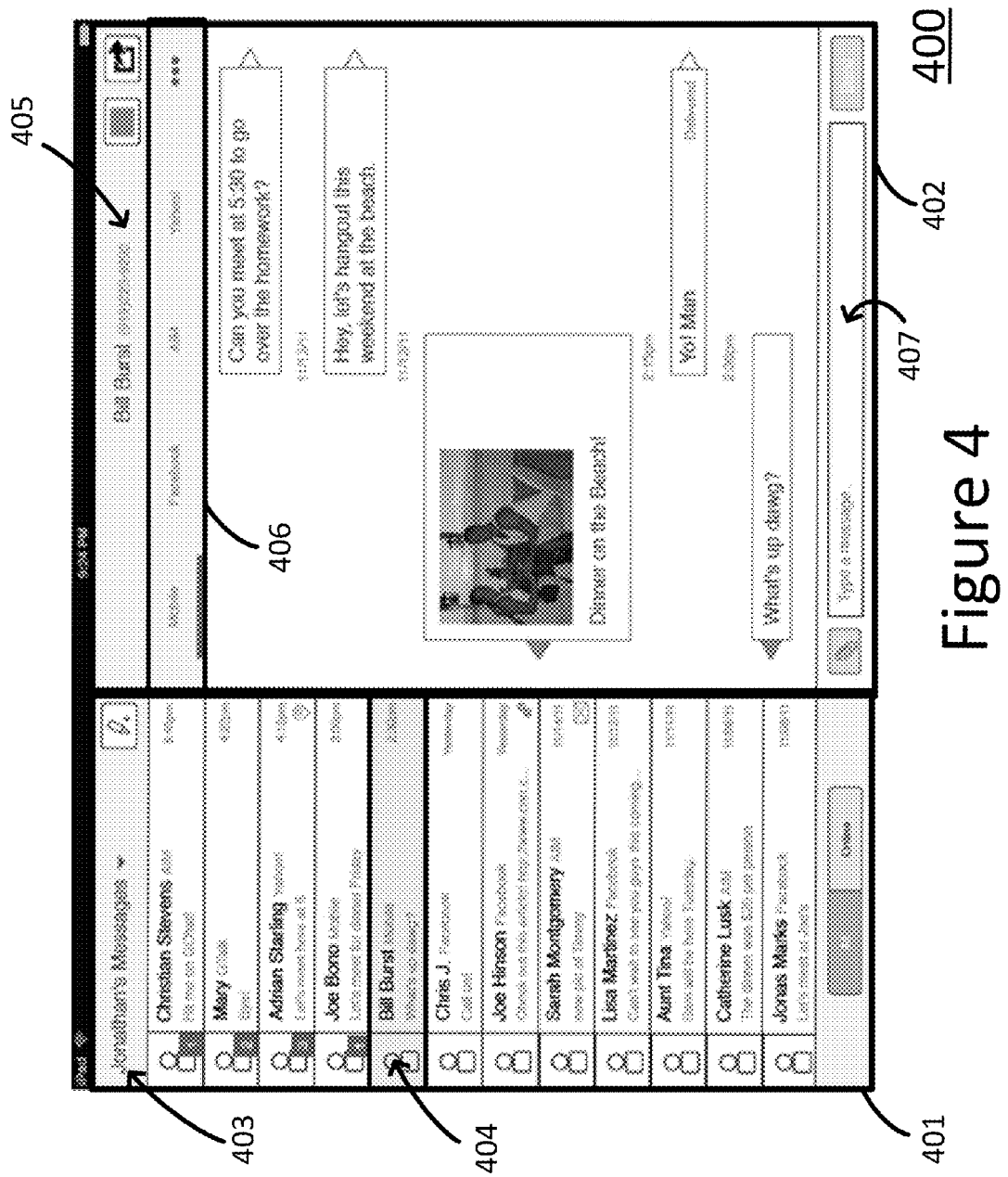
FIG. 4 illustrates an exemplary account management interface.

Thus, FIG. 4 illustrates an exemplary account management interface 400 as generated by the interface module 156 of the management application 101 for an electronic display.

In general, the exemplary account management interface 400 shows a user account 403 that has a number of existing conversations, shown as conversation tiles in a list frame 401. When one of the conversation tiles are selected, a display frame 402 is altered according to polled service information and available messaging service relative to the selected conversation tile.

In particular, the user interface 400 includes a list frame 401, a display frame 402, a user account 403, a conversation tile 404, a header 405, a service panel 406, and a unified composer 407.

The list frame 401 may generally be a table, such as, a column of rectangular tiles that may be vertically manipulated (e.g., scrolling up or down a column direction to view rectangular tiles that are not currently shown in the list frame 401).

The display frame 402 may generally present a display related to a selected rectangular tile of the list frame 401. That is, the display frame 402 may generally be linked to the list frame 401, such that the selection of any rectangular tile in the list frame 401 may alter the display of the display frame 402.

The user account 403 is the unique username that identifies the user account data structure. In the case of FIG. 4, the user account 403 is, for example, "Jonathan's Messages" account.

The conversation tile 404 is a currently selected rectangular tile that represents an exchange of messages between a messaging service associated with the user account 403 and a destination messaging account. In the case of FIG. 4, the conversation tile 404 is a, for example, "Bill Burst" conversation.

The header 405 is a portion of the display frame 402 that reflects that the conversation tile 404 has been selected. For example, header 405 displays the "Bill Burst" and a mobile number which matches "Bill Burst" and "Mobile" indicators within conversation tile 404.

The service panel 406 is a list of messaging services as selectable titles. In FIG. 4, four different messaging services are registered to "Jonathan's Messages" account, and thus are displayed within the service panel 406. As illustrated, for example, the service panel 406 presents the following selectable titles: "Mobile," "Facebook," "AIM," and "Yahoo!".

The unified composer 407 permits messages and content to be transferred via any associated messaging account (e.g. source messaging service) through the account management interface to any destination messaging account.

That is, when a message is typed in the unified composer 407, the selector module may permit that message to be sent via the already selected messaging service (e.g., note that "Mobile" is underlined in service panel 406, that the conversation tile 404 present the word "Mobile" after "Bill Burst, and the header 405 displays a mobile number after "Bill Burst") or by one of the other messaging services listed by the service panel 406 (e.g., "Facebook," "AIM," and "Yahoo!").

For instance, the conversations listed in the list frame 401 may be selected via the selector mechanism and messages may be presented via the interface module 156 by the display frame 405 related to the selected conversation. In particular, in FIG. 4, conversation tile 404 is selected.

Further, while the display frame 402 is presenting via the interface module 156 the messages of the conversation tile 404, the management application 101 may utilize the unified composer 407 to transfer messages to and from the electronic device 150 within the selected conversation or via the other messaging services listed in the service panel 406.

For example, in service panel 406, the "Mobile" selectable title is underlined. This underlining is consistent with the selection of conversation tile 404, which presents the word "Mobile" after "Bill Burst", and display by the header 405 of a mobile number after "Bill Burst."

In this case, when the unified composer is selected, a message may be entered and transferred to a destination messaging account (e.g., "Bill Burst Mobile" account) via the related source messaging service (e.g., Jonathan's Mobile Messaging service).

Further, the unified composer 407 and account management interface 400 permit the selection of a different destination messaging account (e.g. "Bill Burst" Facebook Chat account) and a related different source messaging service listed by the service panel 406.

That is, the selectable titles presented by the service panel 406 are related to the sub-structure of the user account 403, so that the user interface 400 may display multiple conversations between the user account 403 and other destination messaging accounts. That is, the selectable titles listed in the service panel 406 are based on the messaging services available for a remote user (e.g., "Bill Burst").

Therefore, the parallel management by the management module 155 permits the selection by selector mechanism of one of multiple destination messaging account entries for a "Bill Burst" when the unified composer 407 initiates a new message. That is, when a message is typed in the unified composer 407, the selector module may permit that message to be sent via the already selected messaging service or by one of the other messaging services listed by the service panel 406. Thus, messages may be sent via the unified composer from any associated messaging service through the account management interface to any destination messaging account.

In general, to switch between different messaging services of the user account within the account management interface, operations such as the selection of a particular conversation tile associated within the list frame 404, the selection of a selectable title within the header 406, or the manipulation of the display frame 402 via a swiping motion may be performed.

Figure 5:
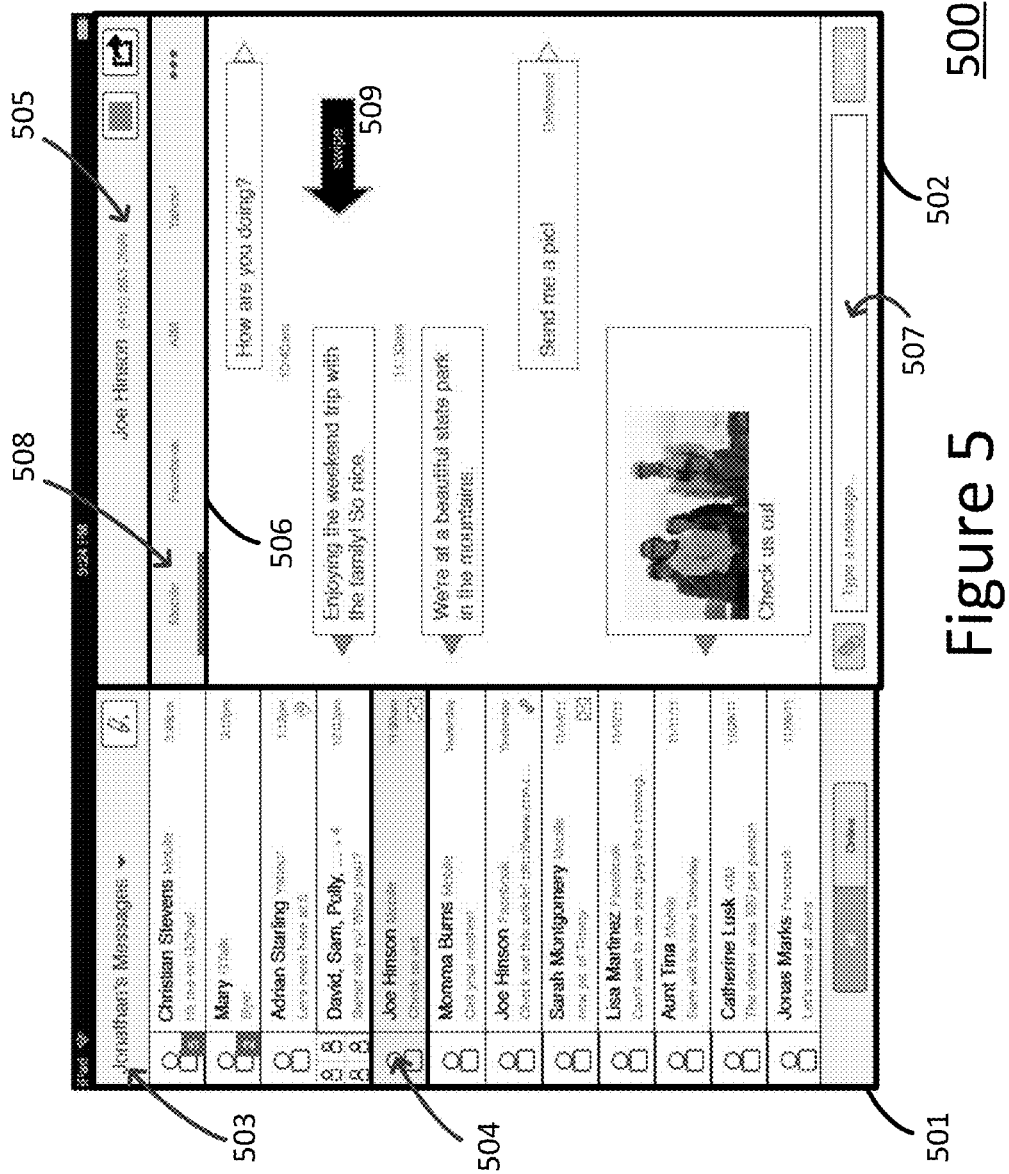
FIG. 5 illustrates an exemplary account management interface in operation.
Figure 6:
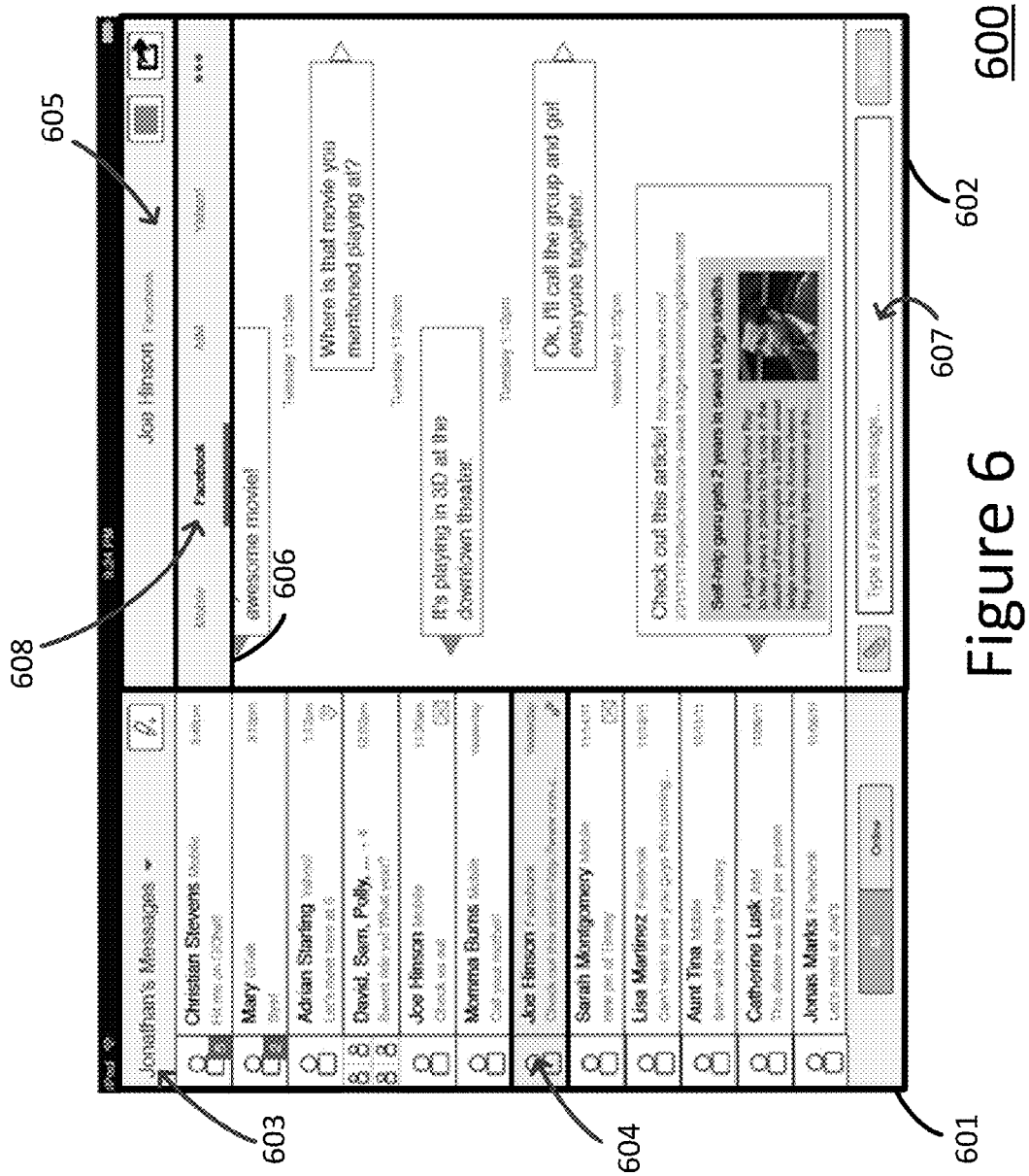
FIG. 6 illustrates an exemplary account management interface in operation.

Switching between messaging services will now be explained in regards to FIGS. 5 and 6. FIGS. 5 and 6 illustrate exemplary account management interfaces 500, 600 as generated by the management application 101 for display by an electronic display.

The account management interfaces 500, 600 respectively include list frames 501, 601, display frames 502, 602, user accounts 503,603, conversation tiles 504,604, headers 505, 605, service panels 506,606, and unified composers 507,607, all of which may be operated in a fashion similar to the matching portions of FIG. 4.

Beginning with FIG. 5, the list menu 501 of user interface 500 displays all conversations between "Jonathan's Messages" account and destination messaging account.

In particular, it is noted that two different "Joe Hinson" tiles are presented, as Joe Hinson is a remote user who uses two different messaging services (and thus has two different destination messaging accounts). That is, the conversation tile 504 represents the conversation between "Jonathan's Messages" account and Joe Hinson's Mobile account, while the conversation tile 604 represents the conversation between "Jonathan's Messages" account and Joe Hinson's Facebook account.

In the present example, since the conversation tile 504 is selected, the interface module 156 generates the display frame 502 to reflect service information relative to the conversation tile 504. That is, the interface module 156 generates the display frame 502 such that the header 505 displays a 10-digit number, which indicates a mobile number of the Mobile Messaging account, next to the name "Joe Hinson," and the service panel 506 displays the underlined "Mobile" title 508. Consistently, the conversation tile 504 (e.g., Joe Hinson's Mobile tile) is highlighted under list menu 501.

Further, when "Jonathan's Messages" account desires to change from the Joe Hinson's mobile phone conversation to the Joe Hinson's Facebook conversation, then "Jonathan's Messages" account may perform one of the following actions. "Jonathan's Messages" account may select the conversation tile associated with the Joe Hinson's Facebook conversation (e.g., conversation tile 604), may select the "Facebook" title 608, or manipulate the electronic display in a swiping motion (e.g., as indicated by the swipe arrow 509). Any one of these actions may automatically alter the presentation of the display frame 502 to display frame 602.

Further, regarding the swiping motion, the swiping motion may be made from right to left or from right to left within the display frame 602 using a cursor controlled by a device connected the electronic device 150 (e.g., a mouse or the like) or by contact with the surface of the electronic display of the electronic device 150 (e.g., a touch screen). When the motion is made, the selection of the service panel 506 is advanced one slot in the opposite direction (e.g., from the left to the right). For instance, when "Jonathan's Messages" account makes a swiping motion in the direction of the swipe arrow 509, an underline bar of service panel 506 moves from the "Mobile" title 508 to the "Facebook" title 608.

Thus, through any of these actions, "Jonathan's Messages" account can now view the Facebook conversation. Thus, "Jonathan's Messages" account may now select a messaging service and use the unified composer to send messages via that messaging service. Further, when messaging services are switched, text in the unified composer also changes (i.e., from unified composer 507 to unified composer 607).

Figure 7:
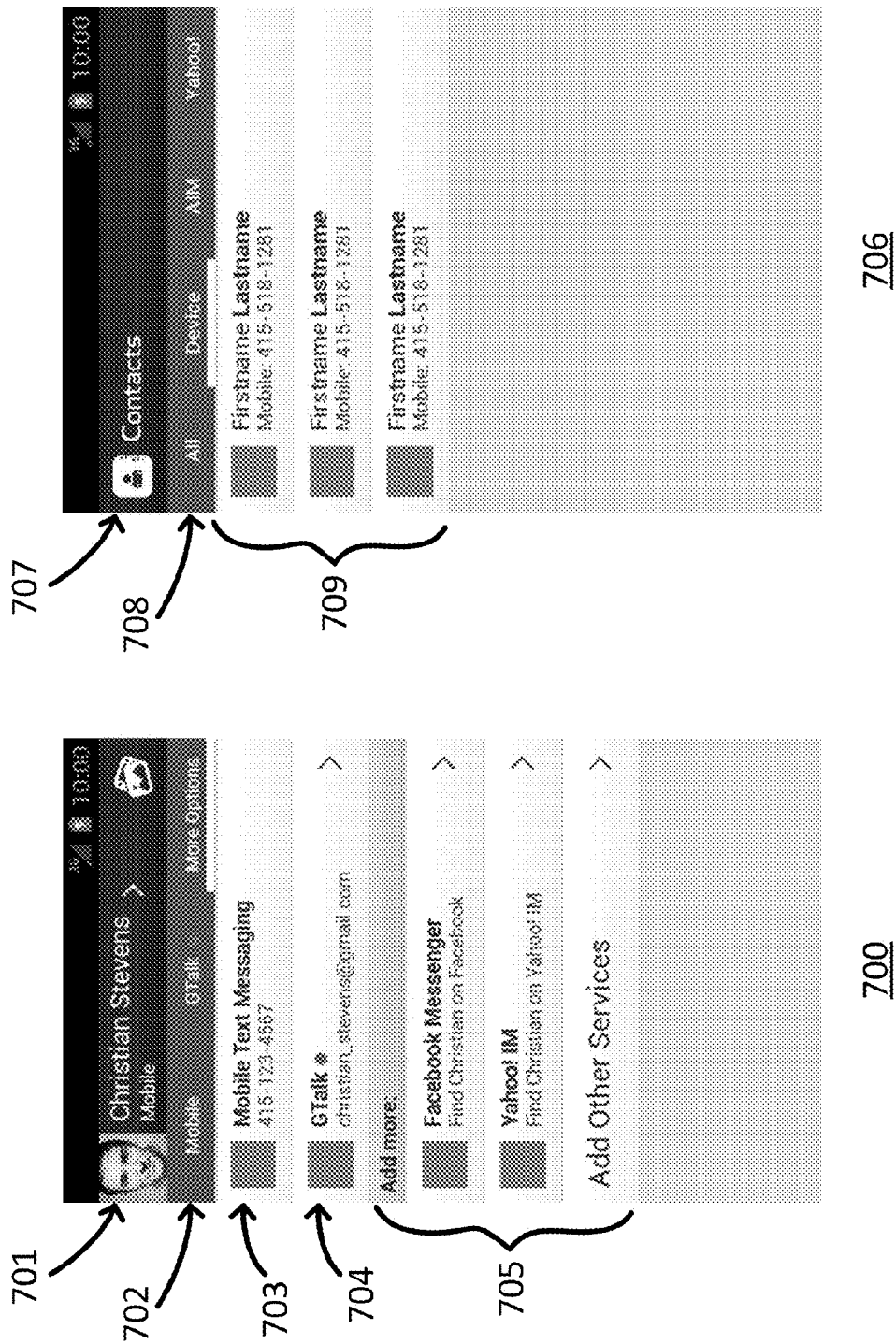
FIG. 7 illustrates exemplary account management interfaces.

In view of the description above, an exemplary alternative account management interface as generated by the management application 101 will now be described below. FIG. 7 illustrates exemplary account management interfaces 700, 706 as generated by the management application 101 for display on an electronic display.

In general, the exemplary account management interface 700 presents a user account as noted in the header 701, where the "More Options" title is selected from the service panel 702, which in turn displays two associated messaging services 703, 704 along with an add service menu 705. Thus, the account management interface 700 includes a header 701, a service panel 702, messaging service tiles 703-704, and an add service menu 705.

The header 701 presents the user account (i.e., in this case "Christian Stevens Mobile" account) that is currently operating the management application 101.

The service panel 702 presents the messaging services currently configured for messaging by the user account via the management application 101 as selectable titles (e.g., "Mobile", "GTalk", and "More Options").

The add service menu 705 presents suggested messaging services tiles and an add service tile. Specifically, the add service menu 705 presents a "Facebook Messenger" tile that when selected may allow a user to submit their Facebook messaging account credentials to the management application 101 and associate the Facebook Chat messaging service with the user account. Similarly, the add service menu 705 presents a "Yahoo! IM" tile that when selected may allow a user to submit their Yahoo! messaging credentials to the management application 101 and associate the Yahoo! Instant Messenger messaging service. Alternatively, a service not listed by selecting the "Add Other Services" tile may be added via in the add service menu 705.

In general, the exemplary account management interface 707 presents a contacts list as noted in header 707, where the "Device" title is selected from a service panel 708, which in turn displays contacts (e.g., destination messaging accounts) stored on the electronic device 150. Thus, the account management interface 706 includes the header 707, the service panel 708, and a list menu 709.

The header 707 presents a set of subject matter indicators (i.e., in this case the text "Contacts" and an icon) for the account management interface 706.

The service panel 708 provides selectable titles (i.e., "All", "Device", "AIM", and "Yahoo!") relative to the subject matter.

The list menu 709 may generally be table, such as, a column of rectangular tiles that may be vertically manipulated (e.g., scrolling up or down a column direction to view rectangular tiles that are not currently shown in the list menu 709).

Thus, for example, the management application 101 may generate via the interface module 156 the account management interface 700 in support of managing multiple user accounts and multiple messaging services.

In particular, in the account management interface 700, the "More Options" title has been selected and thus the messaging service tiles 703-704 and the add service menu 705 are presented by the user interface 700.

That is, in the user interface 700, because "Christian Stevens" user account has previously registered and a Mobile Messaging service (e.g., "Mobile") and a Google Talk messaging service (e.g., "GTalk") have been associated with the account, both the service panel 702 and the messaging service tiles 703-704 present these messaging services in their respective forms.

Further, the mobile phone account (e.g., "Mobile") and the Google Talk account may be configured based on user preferences by selecting the respective service title within the service panel 702 or the relative messaging service tile 703-704. Once messaging services and accounts are registered to a user account or on the electronic device 150, a user (e.g., the "Christian Stevens") may access the conversations and messages associated with the associated messaging services and accounts, along with contacts relative to those messaging services and accounts.

Specifically in account management interface 706, the header 707 is displaying contacts locally stored on a device (which may be any electronic device 150) and the service panel 708 is providing selectable titles (i.e., "All", "Device", "AIM", and "Yahoo!") relative to the registered messaging services and accounts on the device. Further, the list menu 709 provides a messaging service contact list based on the chosen selectable title.

Thus, via the selector mechanism any of the titles within the service panel 708 may be selected in order to display the respective messaging service contact list. In account management interface 706, the "Device" title has been selected and thus, the list menu 709 presents the three contacts locally stored on the device (e.g., the mobile phone).

In general, similar to FIGS. 5 and 6, to switch between different messaging services of the user account within the account management interface, operations such as the selection of a selectable title within the service panels 702, 708, or the manipulation of the area below the service panels 702, 708 via a swiping motion may be performed.

Figure 8:
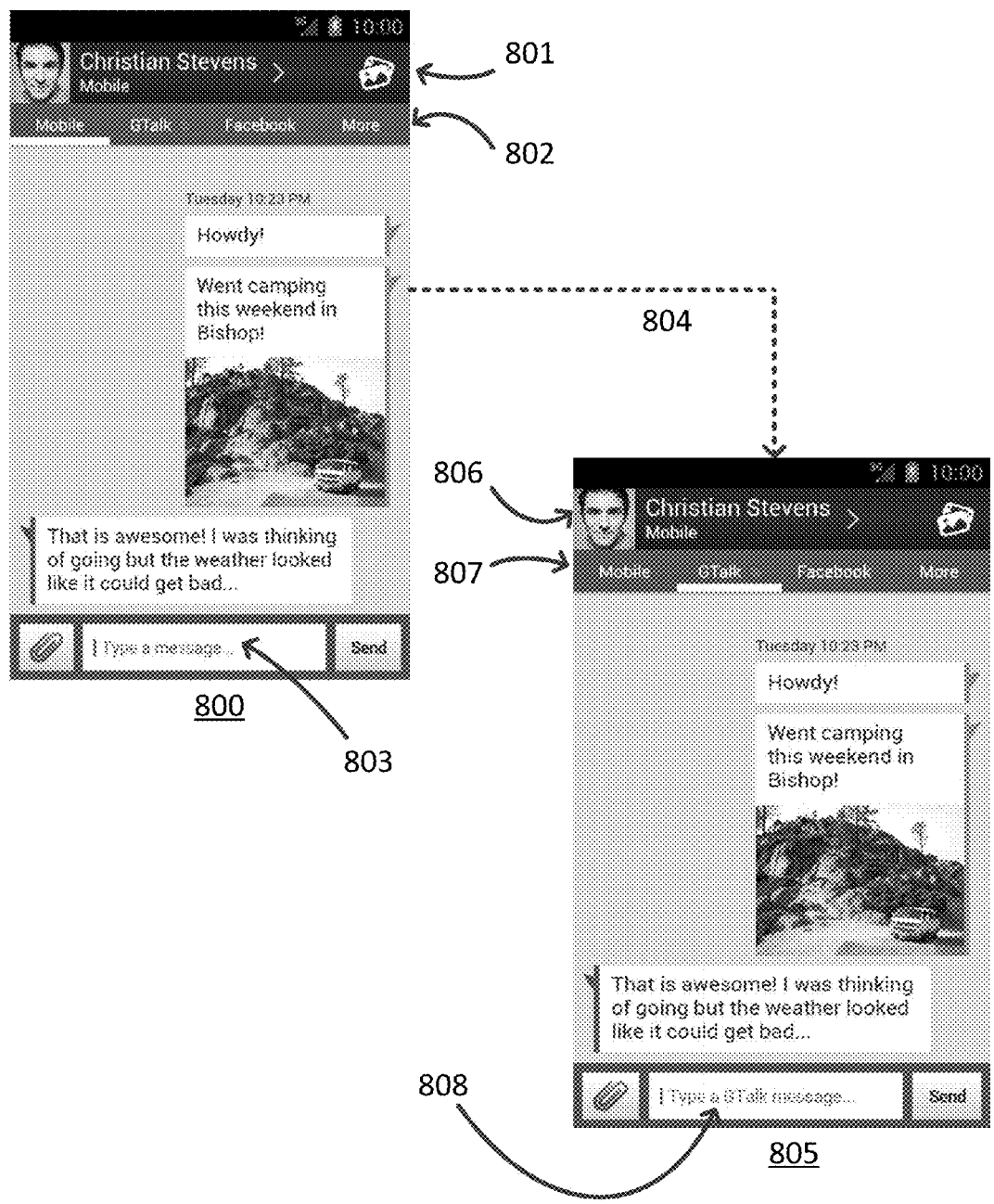
FIG. 8 illustrates exemplary account management interfaces in operation.

Switching between messaging services will now be explained in regards to FIG. 8. FIG. 8 illustrates exemplary account management interfaces 800, 805 as generated by the management application 101 for display on an electronic display. Thus, the account management interfaces 800, 805 illustrate the swiping motion found in account management interfaces 500, 600 of FIGS. 5 and 6.

The account management interfaces 800, 805 respectively include headers 801, 806, service panels 802, 807, and unified composes 803, 808, which may be operated in a fashion similar to FIGS. 5 and 6.

In FIG. 8, the swiping action or title selection action may be utilized within user interface 800 to transition 804 to user interface 805. That is, in user interface 800, the "Mobile" title of service panel 802 is selected, as indicated by an underline bar. And if viewing a display relative to the Google Talk messaging service is desired, the "GTalk" title of the service panel 802, 807 may be directly selected or a swipe from right to left to advance the underlining left to right may be implemented.

Regardless of the switching method employed by the user, the underline bar moves to "GTalk" title, as indicated in service panel 807, and the unified compose 803 transitions 804 to unified composer 808 to reflect the change in messaging service.

In view of the above, a description of polling service information by a management application 101 will now be given in reference to FIGS. 9 and 10.

In general, the management module 155 of the management application 101 utilizes the application module 157 and the virtual connections 104a, 106a to poll service information from communication services 103, 105. In particular, the management mechanism and the notification mechanism work together to poll and analyze service information.

For instance, once a number of messaging services have been associated to the user account, the management mechanism polls the address book, contact, and online status information relative to each of those services and delivers this information to the notification mechanism. The notification mechanism will then present notifications (e.g. a number unread messages) to the interface module 156, so that the interface module 156 may populate the account management interface with, for example, badges.

Figure 9:
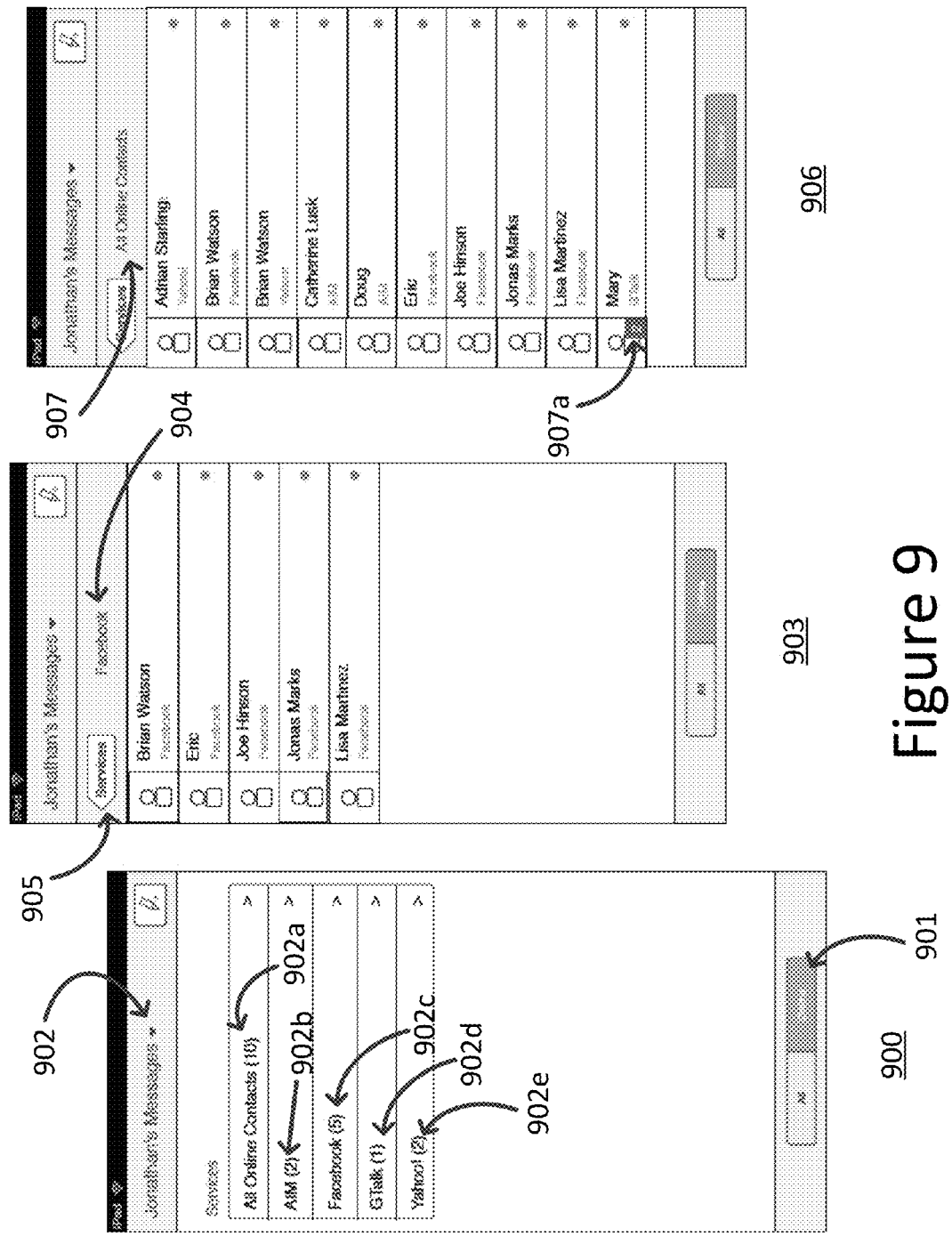
FIG. 9 illustrates exemplary account management interfaces.

For example, FIG. 9 illustrates exemplary list frames 900, 903, 906 as generated by the management application 101 for use generally by any of the account management interfaces described above, where the list frame 900 presents badges 902a-e indicating the number of online user per messaging service, while list frames 903, 906 present the number of conversation tiles in accordance with the badges 902a-e of list frame 900. In particular, the list frame 900 includes a toggle menu 901, an account listing 902 and badges 902a-e; the list frame 903 includes a second header 904 and a services return button 905; and the list frame 906 includes a second header 907 and badge 907a.

Specifically, the list frame 900 includes a toggle menu 901 that alters listing based on whether "All or "Online" is selected. Thus, the user interface 900 is an example of when the interface module presents a top level view of all the messaging services that are loaded into the management application 101.

In this particular illustrative case, the service listing for "Jonathan's Messages" (e.g. an account listing 902) is manipulated by selection of the "Online" button on the toggle menu 901 to display the messaging services that currently have active users. Further, a badge or number (e.g., badges 902a-e) is inserted next to each messaging service to indicate the number of currently active or online users.

For example, the AIM messaging service has two users as indicated by badge 902b (e.g., "AIM (2)"), the Facebook messaging service has five users as indicated by badge 902c (e.g., "Facebook (5)"), the Google Talk messaging service has one user as indicated by badge 902d (e.g., "GTalk (1)"), and the Yahoo! messaging service has two users as indicated by badge 902e (e.g., "Yahoo! (2)") that are currently active. These numbers coincide with the all online contacts badge (e.g. badge 902a), as the number of total users is ten (e.g., "All Online Contacts (10)"). Further, selecting the desired messaging service tile will present which users are active under any of the messaging services listed in the service listing of interface 900.

For instance, if "Jonathan's Messages" account wished to view the currently active Facebook users, then "Jonathan's Messages" account would select the Facebook messaging service tile. Upon selection of the Facebook messaging service tile, the user interface 900 would transition to user interface 903, which in this case presents five currently active Facebook users.

Further, the user interface 903 displays a second header 904 that indicates a "Facebook" listing, since the second header 904 displays a title relative to the selected messaging services tile of user interface 900. Also, the five currently active Facebook users of user interface 903 are consistent with the number of users indicated by badge (e.g. badge 902c) in the Facebook messaging service tile. To return to the service listing of interface 900, the services return button 905 may be selected.

For instance, if "Jonathan's Messages" account wished to view all currently active users, then "Jonathan's Messages" account would select the all online contacts tile. Upon selection of the all online contacts tile, the user interface 900 would transition to user interface 906, which in this case presents ten currently active users.

Further, the user interface 906 displays a second header 907 that indicates a "All Online Contacts" listing, since the second header 907 displays a title relative to the selected messaging services tile of user interface 900. Also, the ten currently active users of user interface 906 are consistent with the number of users indicated by the badge (e.g. badge 902*a*) in the all online contacts tile. In addition, badge 907*a* of user interface 907 indicates that "Jonathan's Messages" account has two unread messages in regards to "Mary" and her "Gtalk" account.

Figure 10:
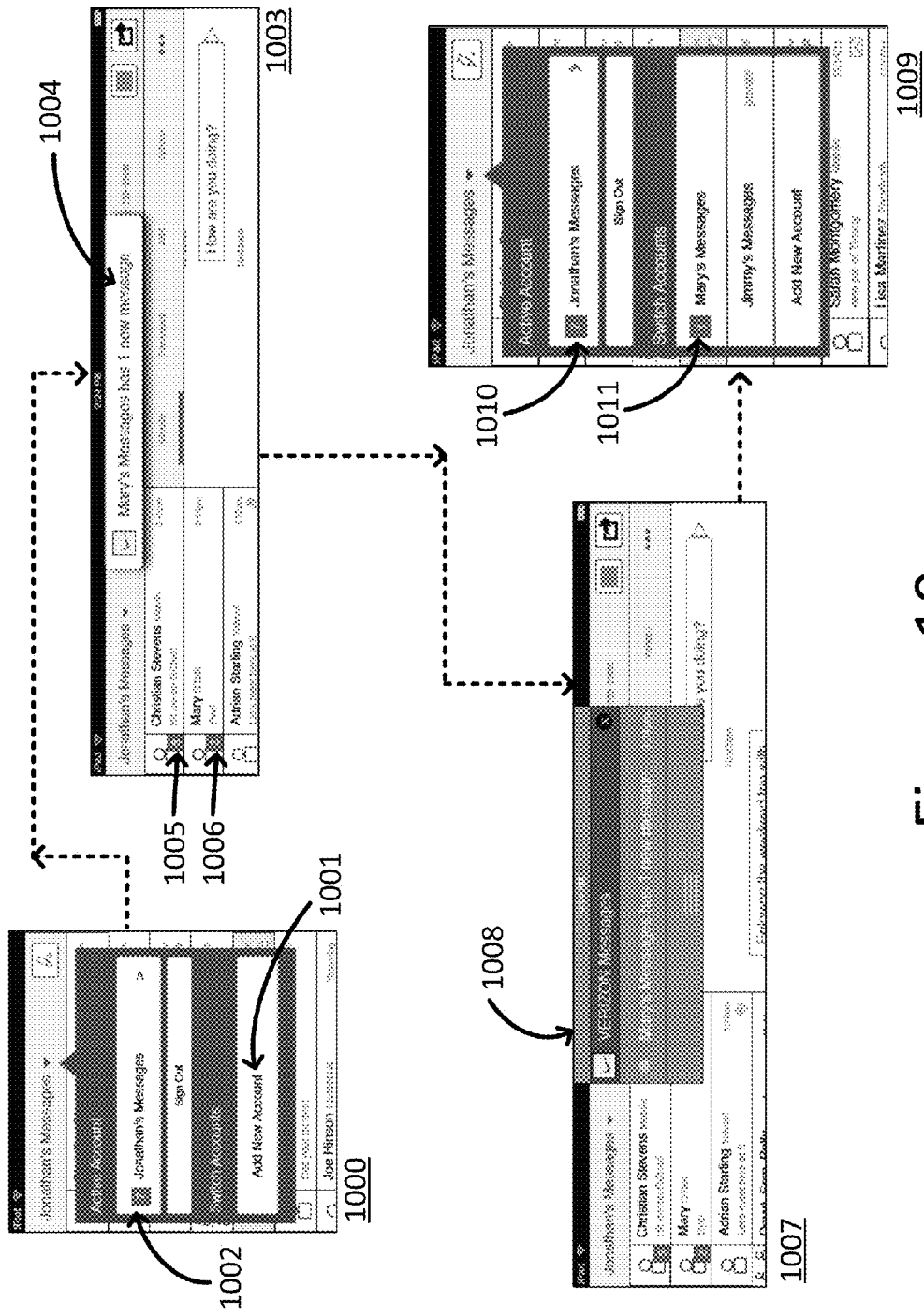
FIG. 10 illustrates exemplary account management interfaces.

Continuing, FIG. 10 illustrates exemplary user interfaces 1000, 1003, 1007, 1009 as generated by the management application 101 for use generally by any of the account management interfaces described above, where each exemplary user interfaces 1000, 1003, 1007, 1009 displays an example of populating the account management interface with notification badges and banners.

The user interface 1000 illustrates when a user desires to add a user account to the management application 101, and thus selects "Jonathans Messages" via the selection mechanism to initiate a drop-drown menu that includes the add new account button 1001 and unread message block 1002, as generated by the notification mechanism. Thus, when the drop-drown menu is displayed, the unread message block 1002 is presented as a badge next to Jonathan's Messages. The unread message block 1002 in this case indicates that Jonathan has seven unread messages.

The user interface 1003 includes a notification banner 1004 and unread message blocks 1005, 1006, as generated by the notification mechanism.

The user interface 1007 includes a notification banner 1008, as generated by the notification mechanism.

The user interface 1009 includes unread message blocks 1010, 1011, as generated by the notification mechanism.

When the add new account button 1001 is selected from the drop-down and a user account will be added to the management application 101. While authorizing and verifying the new account (e.g., by the user entering their respective authorization credentials for their messaging services), the management application 101 continues to poll service information for previously associated messaging accounts. And, further, the management application 101 immediately begins to load the all service information relating to the newly generated user account and associated messaging services.

Next, the notification banner 1004 is presented by interface 1003 when the management application 101 detects that a user account (e.g., "Mary") has at least 1 new message.

Further, although Mary has been added to the management application 101, the account still in use is "Jonathan's Messages" account. Thus, because in the case of interface 1000, Mary has one unread and because "Jonathan's Messages" account is loaded and operational, the notification banner 1004 may be presented to notify any user that Mary has the 1 unread message.

Next, if the notification banner 1004 was missed by a user, the notification menu 1008 may be accessed by making a swipe motion from the top of the electronic display downward. Further, to view the total unread messages of all accounts and messaging services loaded into the management application 101, the Jonathan's messages bar may be again selected to render the active account pup-up displayed in user interface 1009.

Note that Jonathan continues to have seven unread messages as indicated by the unread message block 1010, while Mary has one unread message as indicated by the unread message block 1011. Mary's one unread message is consistent with the "1 new message" indications by notification banners 1004, 1008 and Jonathan's five unread message from Christian Stevens and two unread messages by Mary (e.g., unread message blocks 1005, 1006) is consistent with the unread message block 1002 that indicates seven messages total.

In addition, in user interface 1009, the user account labeled Jimmy's Messages has an indication that this account is private. This setting may be chosen at any time by the owner of the account (e.g., selecting a privacy button when entering messaging account credentials).

Figure 11:
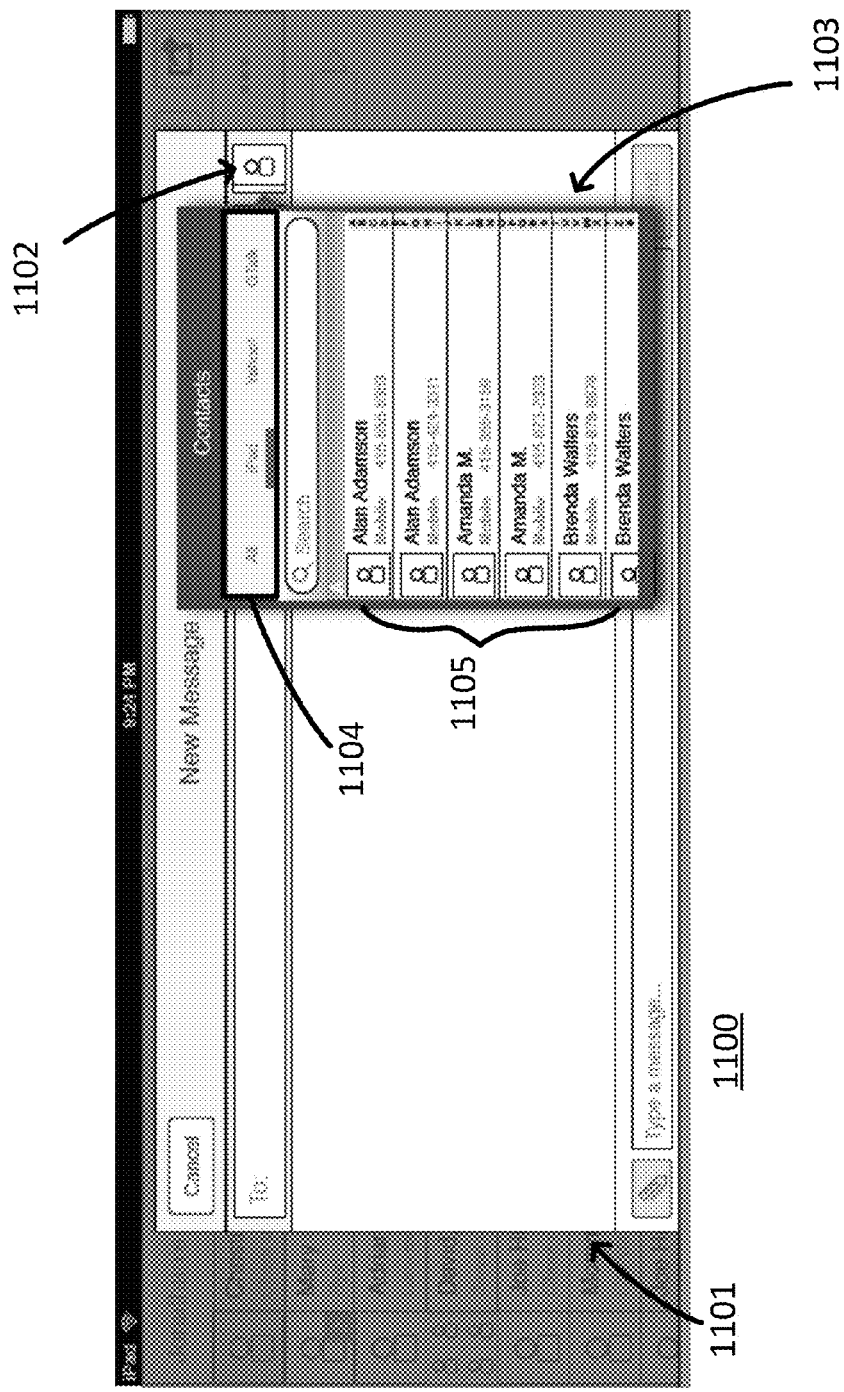
FIG. 11 illustrates an exemplary account management interface.

In view of the above, a description of the unified composer will now be given in reference to FIG. 11.

In general, the management module 155 of the management application 101 utilizes the interface module 156 to generate a field where messages may be generated and associated with a source messaging service. Thus, FIG. 11 illustrates an exemplary user interface 1100 as generated by the management application 101 for implementing a unified composer that includes a new message pop-up 1101, a contact search button 1102, a contacts pop-up 1103, a service panel 1104, and a list frame 1105.

In this example, the interface module 156 of the management application 101 generates the new message pop-up 1101, which is an interface that overlays, e.g., the account management interface, to facilitate the selection of a contact in a unified composer. Next, the contact search button 1102 is selected via the selection mechanism and a contacts pop-up 1103, which is an interface that overlays, e.g., the new message pop-up 1101, is presented. From this menu, any messaging service may be selected from the service panel 1104 and in turn, any contacts may be listed relative to the selected messaging service in the list frame 1105.

That is, multiple lists of contacts may be displayed to the user, such as the local address book of the device as well as contacts from external messaging services (e.g., "Yahoo!" and "GTalk). Thus, to show contacts, any messaging service from the service panel 1404 may be selected or a swipe through the categories of contacts may be implemented.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a device including a memory with a management application installed thereon, wherein the management application comprises:
a manager mechanism of a manager module configured to generate an umbrella data structure having a generated user account that uses first and second messaging account credentials to access respective first and second user accounts of a plurality of user accounts and associate at least one communication service as a messaging account with the plurality of user accounts;
an interface module that generates a user interface for the generated user account that presents the plurality of user accounts associated with the first and second user messaging account credentials and that modifies the user interface based on a selected user account to present a selected account display including the selected user account, messaging accounts associated with the selected user account, and the service information relative to the messaging accounts of the selected user account,
wherein the manager mechanism identifies the at least one communication service for the generated user account based on the first and second messaging account credentials,
wherein the manager mechanism polls service information from the at least one associated communication service, and
wherein the manager module includes an authentication mechanism that verifies the first and second messaging account credentials when the manager module associates the at least one communication service with the first and second user accounts by performing an authentication sequence with the associated communication service.

2. The system of claim 1, wherein the manager module includes a privacy mechanism that manages user account privacy settings that separately govern each user account of the plurality of user accounts, and
wherein user account privacy settings include
a locked mode that permits after successful entry of authorization credentials the presentation of the selected account display, and
an unlocked mode that permits without entering authorization credentials the presentation of the selected account display.

3. The system of claim 2, wherein the manager module includes a notification mechanism that manages notifications presented by the user interface based on the service information polled by the manager mechanism, and
wherein the notification mechanism executes an exclusion mode for user accounts governed by the locked mode.

4. The system of claim 1, wherein the manager module includes a notification mechanism that manages notifications presented by the user interface based on the service information polled by the manager mechanism, and
wherein the notification mechanism manages the notifications according to
an inclusion mode that includes the service information in the notifications,
an exclusion mode that excludes the service information from the notifications, and
a disable mode where the notifications are disabled.

5. The system of claim 1, wherein the interface module includes a composer mechanism that permits entry of a message, selection of any communication service, and selection of a destination messaging account.

6. The system of claim 1, wherein the manager module includes a selection mechanism that identifies, based on input received through the user interface, the selected user account from the plurality of user accounts.

7. A method, comprising:
generating, by an electronic device, an umbrella data structure having first and second user accounts of a plurality of user accounts, the first and second user accounts having respective first and second messaging account credentials;
identifying at least one communication service based on the messaging account credentials;
associating at least one communication service as a messaging account for the plurality of user accounts;
verifying the first and second messaging account credentials while associating the at least one communication service with the first and second user accounts by performing an authentication sequence with the associated communication service;
generating a user interface that presents the plurality of user accounts;
polling service information of the umbrella data structure from the at least one communication service associated with the first and second messaging account credentials; and
modifying the user interface based on an identification of a selected user account to present a selected account display including the selected user account, messaging accounts associated with the selected user account, and the service information relative to the messaging accounts of the selected user account.

8. The method of claim 7, wherein the method further comprises:
managing user account privacy settings that separately govern each user account of the set of user accounts, and
wherein user account privacy settings include
a locked mode that permits after successful entry of authorization credentials the presentation of the selected account display, and
an unlocked mode that permits without entering authorization credentials the presentation of the selected account display.

9. The method of claim 8, wherein the method further comprises:
managing notifications, that are presented by the user interface, based on the service information, and
wherein managing notifications includes executing an exclusion mode for user accounts governed by the locked mode.

10. The method of claim 7, wherein the method further comprises:
managing notifications, that are presented by the user interface, based on the service information, and
wherein managing notifications includes executing
an inclusion mode that includes the service information in the notifications,
an exclusion mode that excludes the service information from the notifications, and
a disable mode where the notifications are disabled.

11. The method of claim 7, wherein the method further comprises:
provproviding a composer interface within the user interface that permits entry of a message, selection of a communication service, and a destination messaging account.

12. The method of claim 7, wherein the method further comprises:
identifying, based on input received through the user interface, the selected user account from the plurality of user accounts.

13. A non-transitory computer-readable medium tangibly embodying computer-executable instructions, comprising:
generating, by an electronic device, an umbrella data structure having first and second user accounts of a plurality of user accounts, the first and second user accounts having respective first and second messaging account credentials;
identifying at least one communication service based on the messaging account credentials;
associating at least one communication service as a messaging account with each user account;
verifying the first and second messaging account credentials while associating the at least one communication service with the first and second user accounts by performing an authentication sequence with the associated communication service;
generating a user interface that presents the plurality of user accounts;
polling service information from each associated communication service; and
modifying the user interface based on the identification of a selected user account to present a selected account display including the selected user account, messaging accounts associated with the selected user account, and the service information relative to the messaging accounts of the selected user account.

14. The computer-readable medium of claim 13, wherein the instructions further comprise:
managing user account privacy settings that separately govern each user account of the set of user accounts, and
wherein user account privacy settings include
a locked mode that permits after successful entry of authorization credentials the presentation of the selected account display, and
an unlocked mode that permits without entering authorization credentials the presentation of the selected account display.

15. The computer-readable medium of claim 14, wherein the instructions further comprise:
managing notifications, that are presented by the user interface, based on the service information, and
wherein managing notifications includes executing an exclusion mode for user accounts governed by the locked mode.

16. The computer-readable medium of claim 13, wherein the instructions further comprise:
managing notifications, that are presented by the user interface, based on the service information, and
wherein managing notifications includes executing
an inclusion mode that includes the service information in the notifications,
an exclusion mode that excludes the service information from the notifications, and
a disable mode where the notifications are disabled.

17. The computer-readable medium of claim 13, wherein the instructions further comprise:
providing a composer interface within the user interface that permits entry of a message, selection of a communication service, and a destination messaging account.

18. The computer-readable medium of claim 13, wherein the instructions further comprises:
identifying, based on input received through the user interface, the selected user account from the plurality of user accounts.

19. A system, comprising:
a device including a memory with a management application installed thereon, wherein the management application comprises:
a manager module that includes
a manager mechanism that based on messaging account credentials generates a user account to access a plurality of messaging accounts and associates at least one communication service with the plurality of messaging accounts, and that polls service information from the at least one communication service associated with the plurality of messaging accounts,
an authentication mechanism that verifies the messaging account credentials when the manager module associates any communication service with the user account by performing an authentication sequence with the associated communication service,
a selection mechanism that identifies a selected messaging account from the plurality of messaging accounts associated with the user account based on input received through a user interface, and
a notification mechanism that manages notifications presented by the user interface based on the service information polled by the manager mechanism and associated with the plurality of messaging accounts; and
an interface module that generates the user interface that presents a user account display including the user account, the plurality of messaging accounts associated with the user account, and the service information relative to the plurality of messaging accounts of the user account, and that modifies the user account display based on the selected messaging account to present a selected account display.

20. The system of claim 19, wherein a privacy mechanism of the manager module manages user account privacy settings that governs the user account and associated messaging accounts, and
wherein user account privacy settings include
a locked mode that permits after successful entry of authorization credentials the presentation of the user account display, and
an unlocked mode that permits without entering authorization credentials the presentation of the user account display.

21. The system of claim 19, wherein the notification mechanism manages the notifications according to
an inclusion mode that includes the service information in the notifications,
an exclusion mode that excludes the service information from the notifications, and
a disable mode where the notifications are disabled.

22. The system of claim 19, wherein the interface module includes a composer mechanism that permits entry of a message, selection of any communication service, and selection of a destination messaging account.

* * * * *